US011900954B2

(12) United States Patent
Xiao et al.

(10) Patent No.: US 11,900,954 B2
(45) Date of Patent: Feb. 13, 2024

(54) VOICE PROCESSING METHOD, APPARATUS, AND DEVICE AND STORAGE MEDIUM

(71) Applicant: TENCENT TECHNOLOGY (SHENZHEN) COMPANY LIMITED, Shenzhen (CN)

(72) Inventors: Wei Xiao, Shenzhen (CN); Meng Wang, Shenzhen (CN); Shidong Shang, Shenzhen (CN); Zurong Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 33 days.

(21) Appl. No.: 17/703,713

(22) Filed: Mar. 24, 2022

(65) Prior Publication Data

US 2022/0215848 A1 Jul. 7, 2022

Related U.S. Application Data

(63) Continuation of application No. PCT/CN2021/088156, filed on Apr. 19, 2021.

(30) Foreign Application Priority Data

May 15, 2020 (CN) ......................... 202010413898.0

(51) Int. Cl.
*G10L 19/12* (2013.01)
*G10L 25/06* (2013.01)
(Continued)

(52) U.S. Cl.
CPC .............. *G10L 19/12* (2013.01); *G10L 25/06* (2013.01); *G10L 25/12* (2013.01); *G10L 25/18* (2013.01);
(Continued)

(58) Field of Classification Search
CPC ......... G10L 19/12; G10L 25/06; G10L 25/12; G10L 25/18; G10L 25/21; G10L 25/30;
(Continued)

(56) References Cited

U.S. PATENT DOCUMENTS

| | | | | |
|---|---|---|---|---|
| 10,354,659 B2 | 7/2019 | Liu et al. | | |
| 2007/0106502 A1* | 5/2007 | Kim | ........................ G10L 19/20 | 704/207 |

(Continued)

FOREIGN PATENT DOCUMENTS

| | | | |
|---|---|---|---|
| CN | 107248411 A | 10/2017 | |
| CN | 110556121 A | 12/2019 | |

(Continued)

OTHER PUBLICATIONS

The World Intellectual Property Organization (WIPO) International Search Report for PCT/CN2021/088156 dated Jun. 29, 2021 5 Pages (including translation).

*Primary Examiner* — Daniel C Washburn
*Assistant Examiner* — Athar N Pasha
(74) *Attorney, Agent, or Firm* — ANOVA LAW GROUP PLLC

(57) ABSTRACT

A voice processing method includes: determining a historical voice frame corresponding to a target voice frame; determining a frequency-domain characteristic of the historical voice frame; invoking a network model to predict the frequency-domain characteristic of the historical voice frame, to obtain a parameter set of the target voice frame, the parameter set including a plurality of types of parameters, the network model including a plurality of neural networks (NNs), and a number of the types of the parameters in the parameter set being determined according to a number of the NNs; and reconstructing the target voice frame according to the parameter set.

19 Claims, 9 Drawing Sheets

(51) Int. Cl.

| | |
|---|---|
| ***G10L 25/12*** | (2013.01) |
| ***G10L 25/18*** | (2013.01) |
| ***G10L 25/21*** | (2013.01) |
| ***G10L 25/30*** | (2013.01) |
| ***G10L 25/93*** | (2013.01) |
| ***G10L 19/005*** | (2013.01) |

(52) U.S. Cl.
CPC .............. *G10L 25/21* (2013.01); *G10L 25/30* (2013.01); *G10L 25/93* (2013.01); *G10L 19/005* (2013.01)

(58) Field of Classification Search
CPC ....... G10L 25/93; G10L 19/005; G10L 19/07; G10L 19/08

See application file for complete search history.

(56) References Cited

U.S. PATENT DOCUMENTS

| | | | | |
|---|---|---|---|---|
| 2009/0319264 | A1* | 12/2009 | Yoshida | G10L 19/005 704/E21.001 |
| 2012/0323567 | A1* | 12/2012 | Gao | G10L 19/09 704/201 |
| 2014/0236583 | A1* | 8/2014 | Rajendran | G10L 19/005 704/219 |
| 2017/0169833 | A1* | 6/2017 | Lecomte | G10L 19/24 |
| 2017/0187635 | A1* | 6/2017 | Subasingha | H04L 43/16 |
| 2018/0366138 | A1* | 12/2018 | Ramprashad | G10L 21/0208 |
| 2020/0243102 | A1* | 7/2020 | Schmidt | G06N 20/10 |

FOREIGN PATENT DOCUMENTS

| | | | |
|---|---|---|---|
| CN | 111063361 | A | 4/2020 |
| CN | 111554322 | A | 8/2020 |

* cited by examiner

VOICE PROCESSING METHOD, APPARATUS, AND DEVICE AND STORAGE MEDIUM

RELATED APPLICATION(S)

This application is a continuation application of PCT Patent Application No. PCT/CN2021/088156 filed on Apr. 19, 2021, which claims priority to Chinese Patent Application No. 202010413898.0 filed on May 15, 2020, all of which are incorporated herein by reference in entirety.

FIELD OF THE TECHNOLOGY

The present disclosure relates to the technical field of Internet, and in particular, to a voice processing method, a voice processing apparatus, a voice processing device, and a computer-readable storage medium.

BACKGROUND

Voice over Internet protocol (VoIP) is a voice communication technology, which can implement voice communication in the Internet via the Internet protocol (also referred to as the IP), for example, voice calls and multimedia conferences.

During the transmission of the voice signal through a VoIP system, voice quality impairment may occur. Packet loss concealment (PLC) technology may be used to help address the voice quality impairment issue. One mechanism of the PLC technology is that when a receiving terminal does not receive an $n^{th}$ (n is a positive integer) voice frame, signal analysis is performed on an $(n-1)^{th}$ voice frame to conceal the $n^{th}$ voice frame. However, due to the limited signal analysis capability and the limited voice processing capability of the typical PLC technology, the VoIP is not readily applicable to the scenario of sudden packet loss on the existing network.

SUMMARY

In one aspect, the present disclosure provides a voice processing method, including: determining a historical voice frame corresponding to a target voice frame; determining a frequency-domain characteristic of the historical voice frame; invoking a network model to predict the frequency-domain characteristic of the historical voice frame, to obtain a parameter set of the target voice frame, the parameter set including a plurality of types of parameters, the network model including a plurality of neural networks (NNs), and a number of the types of the parameters in the parameter set being determined according to a number of the NNs; and reconstructing the target voice frame according to the parameter set.

In another aspect, the present disclosure provides a voice processing device, the device including a memory storing computer program instructions; and a processor coupled to the memory and configured to execute the computer program instructions and perform: determining a historical voice frame corresponding to a target voice frame; determining a frequency-domain characteristic of the historical voice frame; invoking a network model to predict the frequency-domain characteristic of the historical voice frame, to obtain a parameter set of the target voice frame, the parameter set including a plurality of types of parameters, the network model including a plurality of neural networks (NNs), and a number of the types of the parameters in the parameter set being determined according to a number of the NNs; and reconstructing the target voice frame according to the parameter set.

In yet another aspect, the present disclosure provides a non-transitory computer-readable storage medium storing computer program instructions executable by at least one processor to perform: determining a historical voice frame corresponding to a target voice frame; determining a frequency-domain characteristic of the historical voice frame; invoking a network model to predict the frequency-domain characteristic of the historical voice frame, to obtain a parameter set of the target voice frame, the parameter set including a plurality of types of parameters, the network model including a plurality of neural networks (NNs), and a number of the types of the parameters in the parameter set being determined according to a number of the NNs; and reconstructing the target voice frame according to the parameter set.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

Figure 1:
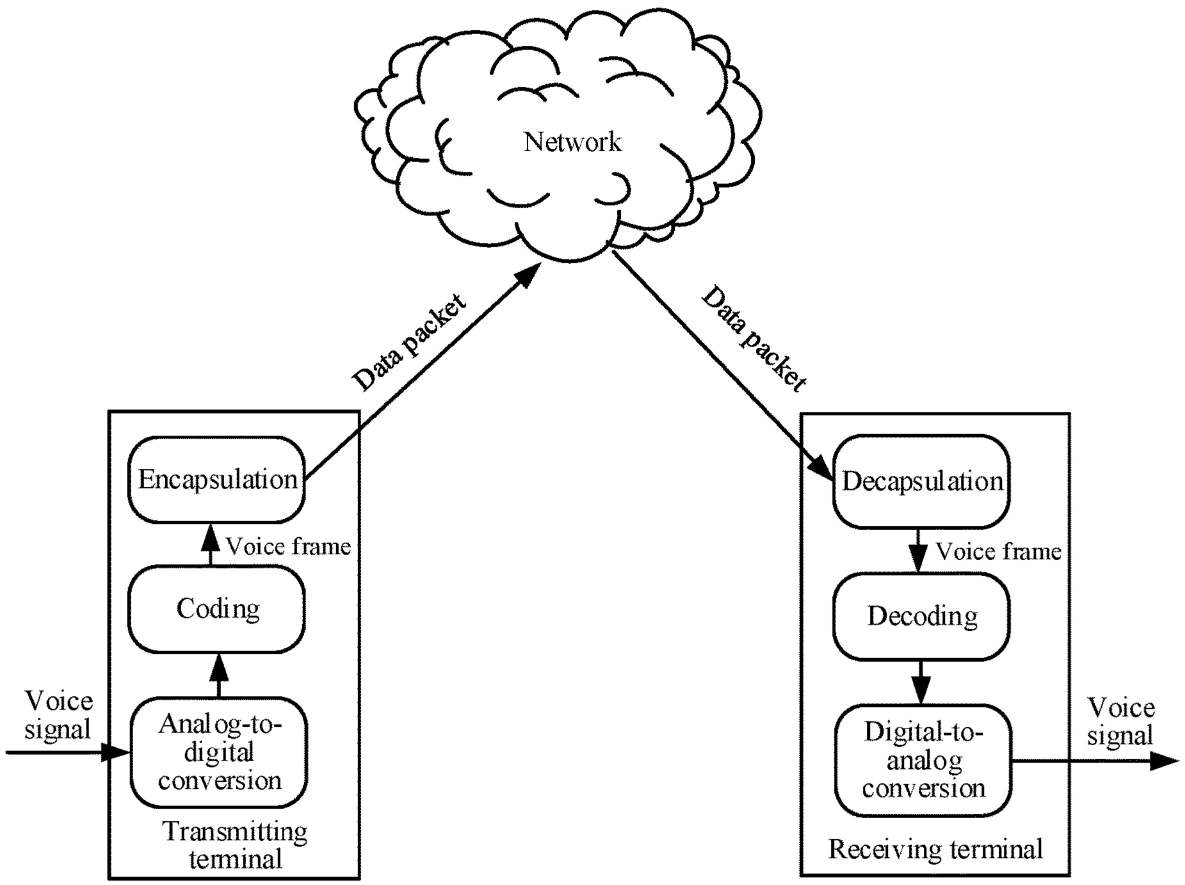
FIG. 1 is a schematic structural diagram of a voice over Internet protocol (VoIP) system according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of the present disclosure described herein can be implemented in a sequence in addition to the sequence shown or described herein. In the following description, the involved term "plurality" refers to at least two, and "various" refers to at least two.

Unless otherwise defined, meanings of technical and scientific terms used in the present disclosure are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, a description is made on nouns and terms in the embodiments of the present disclosure, and the nouns and terms in the embodiments of the present disclosure are applicable to the following explanations.

1) Voice over Internet protocol (VoIP): The mechanism of the VoIP is that a transmitting terminal codes a digital signal corresponding to a voice signal to obtain a plurality of voice frames, and then the plurality of voice frames are packaged according to a transmission control protocol/an Internet protocol (TCP/IP) standard to obtain one or more data packets. Then, the transmitting terminal transmits the data packet to a receiving terminal via the Internet, and the receiving terminal may recover (restore) an original voice signal by decapsulation, decoding, and digital-to-analog conversion, to implement voice communication.

2) Voice frame: The voice frame is obtained by coding the digital signal corresponding to the voice signal. A frame length of the voice frame is determined by a structure of an encoder used during coding. For example, the frame length of one voice frame may be 10 milliseconds (ms), 20 ms, or the like. In the embodiments of the present disclosure, the voice frame may further be divided to obtain daughter frames and subframes. A division manner corresponding to the daughter frames may be the same as or different from a division manner corresponding to the subframes. One daughter frame includes at least one subframe.

3) Frequency-domain characteristic: The frequency-domain characteristic is a characteristic of the voice frame in a frequency-domain space. In the embodiments of the present disclosure, the voice frame may be transformed from a time-domain space to the frequency-domain space by time-frequency transform.

4) Network model: The network model is constructed based on a machine learning (ML) mechanism, and includes a plurality of neural networks (NNs), also referred to as artificial neural networks (ANNs). ML is the core of artificial intelligence (AI), which specializes in how a computer simulates or realizes learning behaviors of humans to acquire new knowledge or skills, and reorganizes the existing knowledge structure to improve the performance of the structure itself. In the embodiments of the present disclosure, the network model is configured to predict a frequency-domain characteristic of a historical voice frame to obtain a parameter set used for reconstructing a target voice frame. A number of types of parameters (that is, some types of parameters are included) in the parameter set is determined according to the number of NNs in the network model.

5) Linear predictive coding (LPC): The LPC is a voice analysis technology, and the mechanism of the LPC is to approximate the voice frame according to a parameter (herein referred to as a short-term correlation parameter of the voice frame) sampled at a past moment, that is, the reconstruction of the voice frame is implemented. In the embodiments of the present disclosure, the LPC may be applicable to reconstruction of an unvoiced frame.

6) Long term prediction (LTP): The mechanism of the LTP is to approximate the voice frame according to a long-term correlation parameter of the voice frame, that is, the reconstruction of the voice frame is implemented. In the embodiments of the present disclosure, the LPC and the LTP may be applicable to reconstruction of a voiced frame.

The embodiments of the present disclosure relate to the VoIP. The VoIP is a voice communication technology, which is to achieve voice calls and multimedia conferences via the IP, that is to say, perform communication via the Internet. The VoIP may also be referred to as Voice over IP, Voice over Internet Phone, Voice of Internet Phone, Voice over Broadband, or a broadband phone service. FIG. 1 is a schematic structural diagram of a VoIP system according to an embodiment of the present disclosure. The system includes a transmitting terminal and a receiving terminal. The transmitting terminal refers to a terminal or a server that initiates a voice signal desired to be transmitted via the VoIP system. Correspondingly, the receiving terminal refers to a terminal or a server that receives the voice signal transmitted via the VoIP system. In the embodiment of the present disclosure, the terminal may include, but is not limited to, a mobile phone, a personal computer (PC), and a personal digital assistant (PDA). A processing flow of the voice signal in the VoIP system is roughly as follows.

Steps performed by the transmitting terminal may include step (1) to step (4), and are to be described with reference to each step.

(1) An inputted voice signal is collected, for example, the inputted voice signal may be collected by using a microphone or other voice collection devices. When or in response to determining that the collected voice signal is an analog signal, analog-to-digital conversion may be performed on the voice signal to obtain a digital signal. Definitely, the collected voice signal may also be the digital signal. The analog-to-digital conversion is not desired.

(2) The digital signal obtained by using step (1) is coded to obtain a plurality of voice frames. The coding herein may refer to OPUS coding. OPUS is a format for lossy sound coding, which is applicable to real-time sound transmission on the network, and includes the following main characteristics: ① supporting a frequency of sample (Fs) range of 8000 Hz (a narrow-band signal) to 48000 Hz (a fullband signal), where Hz is short for hertz; ② supporting a constant bit rate and a variable bit rate; ③ supporting an audio bandwidth from a narrow band to a full band; ④ supporting voice and music; ⑤ dynamically adjusting the bit rate, the audio bandwidth, and a frame size; and ⑤ having a desirable robustness loss rate. Based on the above characteristics, the OPUS may be used for coding in the VoIP system. The Fs during coding may be set according to actual requirements. For example, Fs may be 8000 Hz (hertz), 16000 Hz, 32000 Hz, 48000 Hz, and the like. A frame length of the voice frame is determined by a structure of a coder used during coding. For example, the frame length of one voice frame may be 10 ms, 20 ms, or the like.

(3) The plurality of voice frames are packaged into one or more IP data packets.

(4) The IP data packet is transmitted to the receiving terminal via a network. The network shown in FIG. 1 may be a wide area network (WAN) or a local area network (LAN), or a combination of the two.

Steps performed by the receiving terminal may include step (5) to step (7), and are to be described with reference to each step.

(5) The IP data packet transmitted via the network is received, and the received IP data packet is decapsulated to obtain the plurality of voice frames.

(6) The voice frames are decoded, that is, the voice frames are restored to the digital signal.

(7) Digital-to-analog conversion is performed on the digital signal to obtain a voice signal in an analog signal format, and the voice signal may be outputted (for example, played) by using a voice output device (for example, a loudspeaker).

During the transmission of the voice signal through a VoIP system, voice quality impairment may occur. The voice quality impairment is a phenomenon that after a normal voice signal of the transmitting terminal is transmitted to the receiving terminal, abnormal situations such as playback freeze or poor smoothness occur on the receiving terminal side. An important factor that produces the sound quality impairment is the network. During the transmission of the data packet, the receiving terminal cannot normally receive the data packet due to reasons such as network unstability or anomaly, resulting in the loss of the voice frame in the data packet. In this way, the receiving terminal cannot restore the voice signal. Therefore, the abnormal situation such as freeze may occur When or in response to determining that the voice signal is outputted. In the embodiment of the present disclosure, the following solutions may be used for the sound quality impairment.

One solution is deployed on the transmitting terminal. The mechanism of the solution is that after the transmitting terminal packages and transmits an $n^{th}$ (n is a positive integer) voice frame, a certain bandwidth is still allocated to a next data packet to package and transmit the $n^{th}$ voice frame again. The repackaged data packet is referred to as a "redundant package". Information of the $n^{th}$ voice frame packaged in the redundant package is referred to as redundant information of the $n^{th}$ voice frame. In order to save the transmission bandwidth, the precision of the $n^{th}$ voice frame may be reduced during the repackaging, and the information of the $n^{th}$ voice frame of a low-precision version is packaged into the redundant package. During the voice transmission, when or in response to determining that the $n^{th}$ voice frame is lost, the receiving terminal may wait until the redundant package of the $n^{th}$ voice frame arrives, then reconstructs the $n^{th}$ voice frame according to the redundant information of the $n^{th}$ voice frame, and restores the corresponding voice signal. The solution may further be divided into an in-band solution and an out-of-band solution. The in-band solution is to use idle bytes in one voice frame to store the redundant information. The out-of-band solution is to store the redundant information by using a digital packet packaging technology outside a structure of one voice frame.

Another solution is deployed on the receiving terminal. The mechanism of the solution is that when or in response to determining that the receiving terminal does not receive the $n^{th}$ voice frame, an $(n-1)^{th}$ voice frame is to be read. Signal analysis is performed on the $(n-1)^{th}$ voice frame to conceal (reconstruct) the $n^{th}$ voice frame. Compared with the solution deployed on the transmitting terminal, the solution deployed on the receiving terminal does not require extra bandwidth.

On the basis of the solution deployed on the receiving terminal, in the embodiment of the present disclosure, signal analysis is performed by combining a deep learning technology, so as to improve the signal analysis capability. Therefore, the solution is applicable to the situation (that is, a situation that a plurality of voice frames are lost) of sudden packet loss in the existing network (an actual application scenario). According to the embodiments of the present disclosure, at least the following technical effects can be implemented. ① Signal analysis is performed by combining the deep learning technology, so as to improve the signal analysis capability. ② For modeling based on data of the voice signal, the parameter set of the target voice frame is predicted by deep learning of the historical voice frame, and then the target voice frame is reconstructed according to the parameter set of the target voice frame. In this way, the reconstruction process is convenient and efficient and is applicable to a communication scenario with high real-time requirements. ③ The parameter set used for reconstructing the target voice frame includes a plurality of types of parameters. In this way, learning objectives of the network model are divided, that is, the learning objectives are divided into a plurality of parameters. Each parameter corresponds to different NNs for learning. According to the types of the parameters desired to be included in the parameter set, different NNs can be flexibly configured and combined to form the structure of the network model. In such a manner, the network structure can be greatly simplified, and the processing complexity can be effectively reduced. ④ Packet loss concealment (PLC) is supported. That is to say, when or in response to determining that a plurality of voice frames are lost, the plurality of voice frames can be reconstructed, so as to ensure the quality of voice communication. ⑤ The combined use of the solution deployed on the receiving terminal with the solution deployed on the transmitting terminal is supported, so that the adverse impact caused by the sound quality impairment can be avoided in a manner of relatively flexible combination use.

The voice processing solutions provided in the embodiments of the present disclosure are to be described in detail below with reference to the accompanying drawings.

Figure 2:
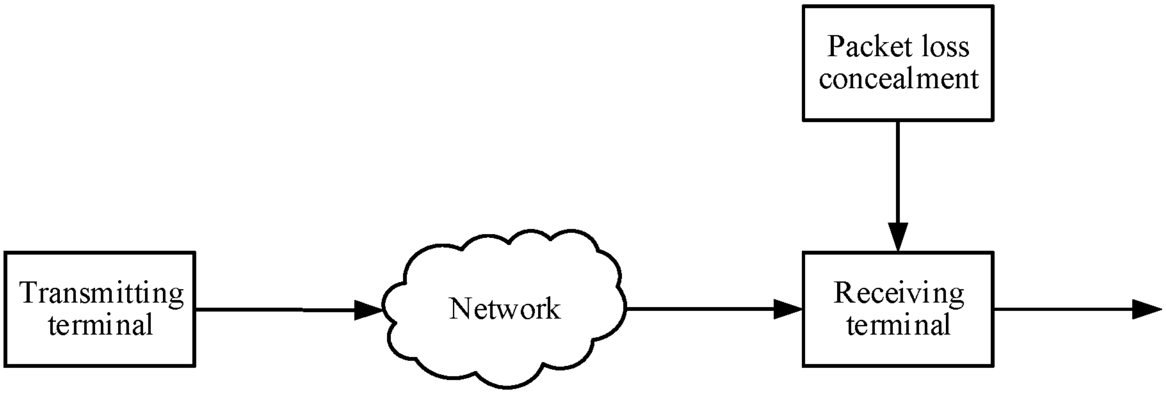
FIG. 2 is a schematic structural diagram of a voice processing system according to embodiment(s) of the present disclosure.

FIG. 2 is a schematic structural diagram of a voice processing system according to an embodiment of the present disclosure. As shown in FIG. 2, the voice processing solution provided in the embodiments of the present disclosure may be deployed on a downlink receiving terminal side. The reasons for the deployment are as follows. 1) The receiving terminal is the last step of the VoIP system in end-to-end communication, and after the reconstructed target voice frame is restored to the voice signal to be outputted (for example, played by using a speaker, a loudspeaker, and the like), a user can intuitively perceive voice quality. 2) In the field of mobile communication, a communication link from a downlink air interface to the receiving terminal is a node most prone to quality problems. Therefore, a relatively direct voice quality improvement can be obtained by setting up a PLC mechanism (the voice processing solution) at the node.

In some embodiments, the server (for example, the transmitting terminal or the receiving terminal implemented as the server) may be an independent physical server, or may be a server cluster formed by a plurality of physical servers or a distributed system, and may further be a cloud server configured to provide basic cloud computing services such as a cloud service, a cloud database, cloud computing, a cloud function, cloud storage, a network service, cloud communication, a middleware service, a domain name service, a security service, a content delivery network (CDN), a big data and artificial intelligence platform, and the like. The terminal (for example, the transmitting terminal or the receiving terminal implemented as the terminal) may be a smart phone, a tablet computer, a notebook computer, a desktop computer, a smart television, a smart watch, or the like, but the present disclosure is not limited thereto. The terminal and the server may be directly or indirectly connected in a manner of wired or wireless communication, which is not limited in the embodiments of the present disclosure.

Figure 3:
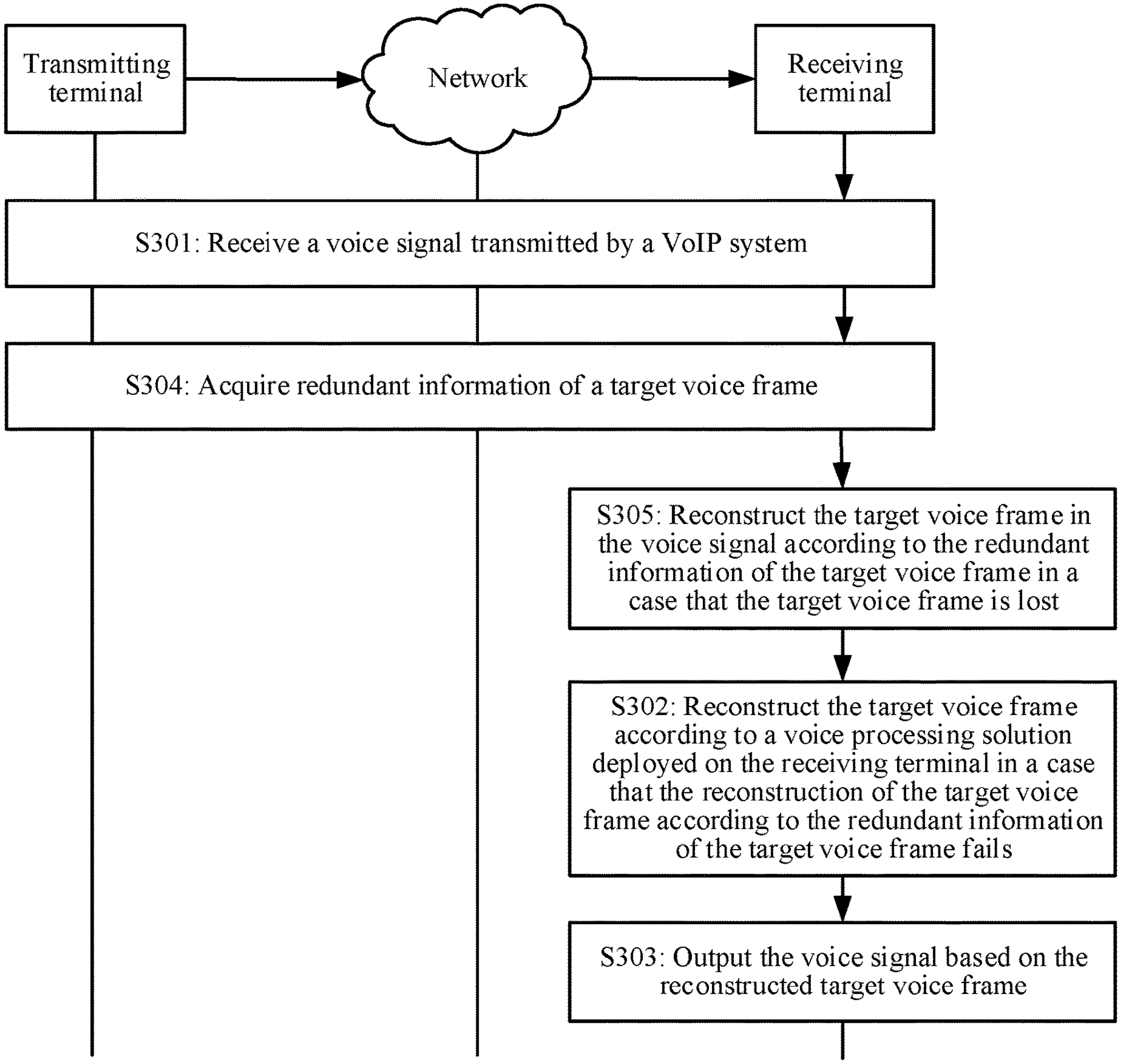
FIG. 3 is a schematic flowchart of a voice processing method according to embodiment(s) of the present disclosure.

FIG. 3 is a flowchart of a voice processing method according to an embodiment of the present disclosure. Since the PLC mechanism may be deployed on the downlink receiving terminal, the process shown in FIG. 3 may be performed by the receiving terminal shown in FIG. 2. The voice processing method includes steps S301-S303.

S301: The receiving terminal receives a voice signal transmitted by a VoIP system.

The voice signal is transmitted to the receiving terminal by the transmitting terminal via a network. It may be learned from the processing flow in the VoIP system that, the voice signal received by the receiving terminal may be the voice signal in the form of the IP data packet. The receiving terminal decapsulates the IP data packet to obtain the voice frame.

S302: When or in response to determining that the target voice frame in the voice signal is lost, the receiving terminal reconstructs the target voice frame by using the voice processing solution deployed on the receiving terminal provided in the embodiment of the present disclosure. The target voice frame herein is the voice frame lost in the voice signal, and may be represented by the $n^{th}$ voice frame. The voice processing solution for reconstructing the target voice frame is to be described in detail in the subsequent embodiments.

S303: The receiving terminal outputs the voice signal based on the reconstructed target voice frame.

After the target voice frame is reconstructed, the receiving terminal decodes and performs digital-to-analog conversion on the reconstructed target voice frame, and plays the voice signal by using the voice output device (for example, a speaker, a loudspeaker, and the like), so as to restore and output the voice signal.

In some embodiments, the voice processing solution deployed on the receiving terminal may be used independently. When or in response to determining that the receiving terminal confirms that the $n^{th}$ voice frame is lost, a function of the PLC is activated to reconstruct the $n^{th}$ voice frame (that is, step S302).

In some embodiments, the voice processing solution deployed on the receiving terminal may further be used in combination with the voice processing solution deployed on the transmitting terminal. The process shown in FIG. 3 may further include the following steps S304-S305.

S304: The receiving terminal acquires redundant information of the target voice frame.

S305: When or in response to determining that the target voice frame in the voice signal is lost, the receiving terminal reconstructs the target voice frame according to the redundant information of the target voice frame.

S302 may be updated as: when or in response to determining that the reconstruction of the target voice frame according to the redundant information of the target voice frame fails, the receiving terminal reconstructs the target voice frame by using the voice processing solution deployed on the receiving terminal provided in the embodiment of the present disclosure.

In a scenario where the voice processing solution deployed on the receiving terminal is used in combination with the voice processing solution deployed on the transmitting terminal, a packaging operation is performed again on the transmitting terminal. That is to say, both the $n^{th}$ voice frame and the redundant information of the $n^{th}$ voice frame are packaged and transmitted. On the receiving terminal, when or in response to determining that the $n^{th}$ voice frame is lost, the receiving terminal first attempts to reconstruct and restore the $n^{th}$ voice frame based on the redundant information of the $n^{th}$ voice frame, when or in response to determining that the $n^{th}$ voice frame fails to be successfully restored, the $n^{th}$ voice frame is reconstructed by using the voice processing solution deployed on the receiving terminal. When or in response to determining that the receiving terminal successfully reconstructs the target voice frame according to the redundant information of the target voice frame, the receiving terminal may directly perform decoding and digital-to-analog conversion on the reconstructed target voice frame, and finally outputs the corresponding voice signal.

In the embodiment of the present disclosure, when or in response to determining that the target voice frame in the VoIP voice signal is lost, the voice processing solution deployed on the receiving terminal may be used to reconstruct the target voice frame. The reconstruction process in the voice processing solution deployed on the receiving terminal is convenient and efficient and is applicable to the communication scenario with high real-time requirements. In addition, PLC is supported. That is to say, when or in response to determining that the plurality of voice frames are lost, the plurality of voice frames can be reconstructed, so as to ensure the quality of voice calls. In addition, the voice processing solution deployed on the receiving terminal may further be used in combination with the voice processing solution deployed on the transmitting terminal, so that the adverse caused by the sound quality impairment can be avoided in a manner of relatively flexible combination use.

The voice processing solution deployed on the receiving terminal provided in the embodiments of the present disclosure is to be described in detail below with reference to the accompanying drawing.

Figure 4:
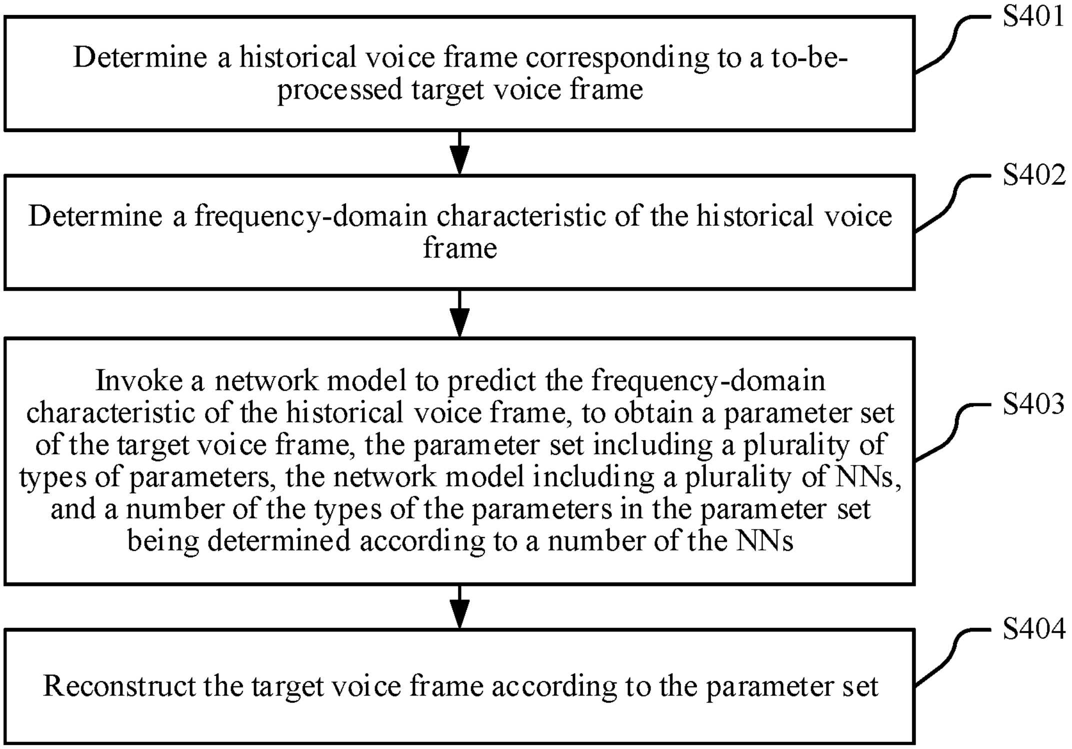
FIG. 4 is a schematic flowchart of a voice processing method according to embodiment(s) of the present disclosure.

FIG. 4 is a flowchart of a voice processing method according to an embodiment of the present disclosure. The method may be performed by the receiving terminal shown in FIG. 2 and includes steps S401-S404.

S401: Determine a historical voice frame corresponding to a to-be-processed target voice frame.

In certain embodiment(s), the term "to-be-processed target voice frame" is interchangeable with the term "target voice frame."

For example, when or in response to determining that a voice frame in the voice signal transmitted by the VoIP system is lost, the lost voice frame is determined as a target voice frame, and the historical voice frame of the target voice frame is also determined. The historical voice frame is a voice frame that is transmitted before the target voice frame and can be successfully restored to the voice signal.

For ease of understanding, the target voice frame is the $n^{th}$ (n is a positive integer) voice frame in the voice signal transmitted by the VoIP system, and the historical voice frame includes the $(n-t)^{th}$ voice frame to the $(n-1)^{th}$ voice frame (that is, a total oft voice frames, t being a positive integer) in the voice signal transmitted by the VoIP system, which are used as an example for description. t is less than n. A value oft may be set according to actual requirements, which is not limited in the embodiment of the present disclosure. For example, when or in response to determining that the operation difficulty is to be reduced, the value oft may be set relatively small, such as t=2. That is to say, two adjacent voice frames before the $n^{th}$ voice frame are selected as historical voice frames. When or in response to determining that a more accurate operation result is to be obtained, the value oft may be set relatively large, such as t=n−1. That is to say, voice frames before the $n^{th}$ voice frame are selected as historical voice frames.

S402: Determine a frequency-domain characteristic of the historical voice frame.

The historical voice frame is a time-domain signal. In order to determine the frequency-domain characteristic of the historical voice frame, time-frequency transform may be performed on the historical voice frame. The time-frequency transform is used for transforming the historical voice frame from a time-domain space to a frequency-domain space, so that the frequency-domain characteristic of the historical voice frame may be determined in the frequency-domain space. The time-frequency transform herein may be implemented by performing operations such as Fourier transform, short-term Fourier transform (STFT), and the like. The performing time-frequency transform on the historical voice frame by performing the STFT is used as an example. The frequency-domain characteristic of the historical voice frame may include an STFT coefficient of the historical voice frame. In some embodiments, the frequency-domain characteristic of the historical voice frame may include an amplitude spectrum of the STFT coefficient of the historical voice frame. Since the calculated amount for calculating the amplitude spectrum is less, the complexity of the voice processing can be reduced.

S403: Invoke a network model to predict the frequency-domain characteristic of the historical voice frame, to obtain a parameter set of the target voice frame, the parameter set including a plurality of types of parameters, the network model including a plurality of NNs, and a number of the types of the parameters in the parameter set being determined according to a number of the NNs.

Parameters in the parameter set are time-domain parameters of the target voice frame desired for reconstructing (restoring) the target voice frame. The parameters in the parameter set may include, but are not limited to, at least one of a short-term correlation parameter of the target voice frame, a long-term correlation parameter of the target voice frame, or an energy parameter of the target voice frame. Types of the target voice frame may include, but are not limited to, a voiced frame and an unvoiced frame. The voiced frame belongs to a quasi-periodic signal, and the unvoiced frame belongs to an aperiodic signal. When or in response to determining that the type of the target voice frame is different, parameters desired for reconstruction of the target voice frame are also different, and then parameters included in the parameter set of the target voice frame are also different.

After the types of the parameters to be included in the parameter set are determined according to the type of the target voice frame, the network structure of the network model may be correspondingly configured according to the types of the parameters to be included in the parameter set. After the network structure of the network model is configured, a deep learning method may be used to train the network model to obtain a network model φ. The frequency-domain characteristic of the historical voice frame is predicted by using the network model φ, so as to obtain a parameter set Pa(n) of the target voice frame.

S404: Reconstruct the target voice frame according to the parameter set.

The parameter set Pa(n) includes the predicted time-domain parameters of the target voice frame. The time-domain parameters are parameters used for representing time-domain characteristics of the time-domain signal. Then the target voice frame can be reconstructed (restored) by using the time-domain characteristics of the target voice frame that are represented by the predicted time-domain parameters of the target voice frame. For example, the target voice frame may be reconstructed by performing inter-parameter filtering on the parameters in the parameter set Pa(n).

In the embodiment of the present disclosure, when or in response to determining that the target voice frame in the voice signal may be reconstructed, the network model may be invoked to predict the frequency-domain characteristic of the historical voice frame corresponding to the target voice frame to obtain the parameter set of the target voice frame, and then the target voice frame is reconstructed by performing inter-parameter filtering on the parameter set. The process of voice reconstruction (restoration) is combined with the deep learning technology, so that the voice processing capability is improved. The parameter set of the target voice frame is predicted by performing deep learning on the historical voice frame, and then the target voice frame is reconstructed according to the parameter set of the target voice frame. In this way, the reconstruction process is convenient and efficient and is applicable to a communication scenario with high real-time requirements. In addition, the parameter set used for reconstructing the target voice frame includes a plurality of types of parameters. In this way, learning objectives of the network model are divided, that is, the learning objectives are divided into a plurality of parameters. Each parameter corresponds to different NNs for learning. According to different parameter sets, different NNs can be flexibly configured and combined to form the structure of the network model. In such a manner, the network structure can be greatly simplified, and the processing complexity can be effectively reduced.

For ease of description, in the subsequent embodiments of the present disclosure, the following example scenario is used as an example for detailed description. The example scenario includes the following information. (1) The voice signal is a broadband signal having Fs=16000 Hz, and an order of an LPC filter corresponding to the broadband signal having Fs=16000 Hz herein may be 16 (for example, the order may be set based on experience). (2) The frame length of the voice frame is 20 ms, and each voice frame includes 320 sample points. (3) The 320 sample points of each voice frame are divided into two daughter frames, a first daughter frame corresponds to first 10 ms of the voice frame, that is, the first daughter frame includes 160 sample points, and a second daughter frame corresponds to last 10 ms of the voice frame, that is, the second daughter frame includes 160 sample points. (4) Each voice frame is divided into 4 subframes by 5 ms, a frame length of each subframe is 5 ms, and the order of the LTP filter corresponding to the subframe having the frame length of 5 ms is 5 (for example, the order may be set based on experience). The above example scenario is cited only to describe the process of the voice processing method of the embodiments of the present disclosure more clearly, but does not constitute a limitation on the related art of the embodiments of the present disclosure. The voice processing method in the embodiment of the present disclosure is also applicable in other scenarios. For example, Fs may correspondingly change in other scenarios, for example, Fs=8000 Hz, 32000 Hz, or 48000 Hz. The voice frame may also change correspondingly, for example, the frame length of the voice frame may be 10 ms, 15 ms, or the like. Division manners of the daughter frames and the subframes may change correspondingly. For example, when or in response to determining that the voice frame is divided into the daughter frames, and the voice frame is divided into the subframes, the division may be performed by 5 ms, that is, the frame lengths of the daughter frame and the subframe are both 5 ms. For the voice processing flow in other scenarios, reference may be made to the voice processing flow in the example scenario according to the embodiment of the present disclosure for analysis.

Figure 5:
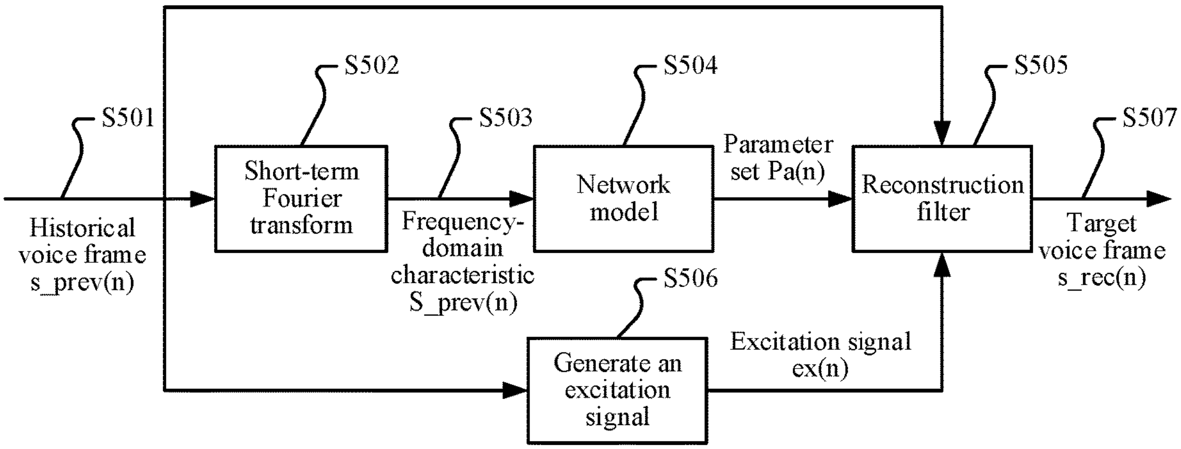
FIG. 5 is a schematic flowchart of a voice processing method according to embodiment(s) of the present disclosure.

FIG. 5 is a flowchart of a voice processing method according to an embodiment of the present disclosure. The method may be performed by the receiving terminal shown in FIG. 2 and includes steps S501-S507.

S501: Determine a historical voice frame corresponding to a to-be-processed target voice frame.

The target voice frame is the $n^{th}$ voice frame in the voice signal. The historical voice frame includes the $(n-t)^{th}$ voice frame to the $(n-1)^{th}$ voice frame in the voice signal, n and t are both positive integers, and a value oft may be set according to actual requirements, for example, t=5.

The historical voice frame is the voice frame that is transmitted before the target voice frame and can be successfully restored to the voice signal. In some embodiments, the historical voice frame is the voice frame that is received by the receiving terminal and restored to the voice signal by performing decoding, that is, the historical voice frame has not been lost. In some embodiments, the historical voice frame is the voice frame that has been lost and have been successfully reconstructed. The reconstruction manner of the historical voice frame is not limited herein. For example, the historical voice frame may be reconstructed based on the voice processing solution deployed on the transmitting terminal, the voice processing solution deployed on the receiving terminal (for example, by any suitable signal analysis technology or in combination with the deep learning technology), or a combination of the above various solutions. The successfully reconstructed voice frame can be normally decoded to restore the voice signal. In certain embodiment(s), after the $n^{th}$ voice frame is successfully reconstructed by using the voice processing method in the embodiment of the present disclosure, when or in response to determining that the $(n+1)^{th}$ voice frame is lost and desired to be reconstructed, the $n^{th}$ voice frame may further serve as the historical voice frame of the $(n+1)^{th}$ voice frame, to facilitate the reconstruction of the $(n+1)^{th}$ voice frame. As shown in FIG. 5, the historical voice frame may be expressed as s_prev(n), and s_prev(n) represents a sequence sequentially composed of sample points included in each voice frame in the $(n-t)^{th}$ voice frame to the $(n-1)^{th}$ voice frame. In the example shown in this embodiment, t is set to 5, and s_prev(n) includes 1600 sample points.

S502: Perform STFT on the historical voice frame to obtain a frequency-domain coefficient corresponding to the historical voice frame.

An algorithm used by video conversion is STFT by way of example.

S503: Extract an amplitude spectrum from the frequency-domain coefficient corresponding to the historical voice frame as the frequency-domain characteristic of the historical voice frame.

Figure 6:
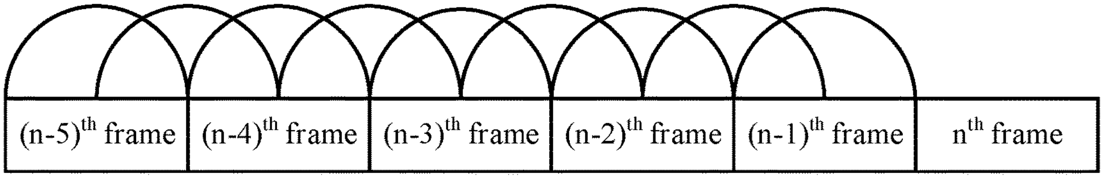
FIG. 6 is a schematic diagram of short-term Fourier transform (STFT) according to embodiment(s) of the present disclosure.

In steps S502-S503, the STFT can be used for transforming the historical voice frame of the time domain to the frequency domain for representation. FIG. 6 is a schematic diagram of STFT according to an embodiment of the present disclosure. In an example shown in FIG. 6, t=5, STFT adopts an operation of 50% windowing and overlapping to reduce the unsmoothness between frames. The nth frame in FIG. 6 refers to the nth voice frame, the (n−1)th frame refers to the (n−1)th voice frame, and so on. The frequency-domain coefficient of the historical voice frame is obtained after the STFT. The frequency-domain coefficient includes a plurality of sets of STFT coefficients. As shown in FIG. 6, a window function used by the STFT may be a Hanning window. A hop size of the window function is 160 sample points. Therefore, in this embodiment, the obtained frequency-domain coefficient includes 9 sets of STFT coefficients, and each set of STFT coefficients includes 320 sample points. In some embodiments, the frequency-domain coefficient (for example, some or all of the STFT coefficients) may be directly used as the frequency-domain characteristic S_prev (n) of the historical voice frame. In some embodiments, amplitude spectra may also be extracted for each set of STFT coefficients. The extracted amplitude spectra are formed into a sequence of amplitude coefficients, and the sequence of the amplitude coefficients is used as the frequency-domain characteristic S_prev(n) of the historical voice frame.

In some embodiments, considering that the STFT coefficients are symmetrical, that is, a set of STFT coefficients may be averagely divided into two parts, therefore, amplitude spectra may be extracted from a part (for example, the previous part) of the each set of STFT coefficients. The extracted amplitude spectra are formed into a sequence of amplitude coefficients, and the sequence of amplitude coefficients is used as the frequency-domain characteristic S_prev(n) of the historical voice frame. In an example shown in this embodiment, for each of 9 sets of STFT coefficients, first 161 sample points of the set of STFT coefficients may be selected, and the amplitude spectrum corresponding to each selected sample point is calculated. Finally, 161×9=1449 amplitude coefficients may be obtained. The sequence of amplitude coefficients is formed by the 1449 amplitude coefficients, and the sequence of amplitude coefficients is used as the frequency-domain characteristic S_prev(n) of the historical voice frame. In order to simplify the computation complexity, in the embodiment of the present disclosure, the implementation corresponding to consideration of the STFT coefficients being symmetrical is used as an example for description.

In the embodiment of the present disclosure, the STFT uses a causal system. That is to say, frequency-domain characteristic analysis is performed only based on the obtained historical voice frame, and a future voice frame (that is, the voice frame transmitted after the target voice frame) is not used for performing the frequency-domain characteristic analysis. In this way, real-time communication requirements can be guaranteed, so that the voice processing solution in the embodiment of the present disclosure is applicable to the voice call scenario with high real-time requirements.

S504: Invoke a network model to predict the frequency-domain characteristic of the historical voice frame, to obtain a parameter set of the target voice frame. The parameter set includes a plurality of types of parameters. The network model includes a plurality of NNs. A number of the types of the parameters in the parameter set is determined according to a number of the NNs.

The definition of each parameter in the parameter set Pa(n) is described in detail below. In the embodiment of the present disclosure, the parameter set Pa(n) includes a plurality of types of parameters. Further, the parameters in the parameter set Pa(n) are used for establishing a reconstruction filter, so as to reconstruct (restore) the target voice frame by using the reconstruction filter. A core of the reconstruction filter includes at least one of an LPC filter or an LTP filter. The LTP filter is responsible for processing the parameters related to long-term correlation of a pitch lag. The LPC filter is responsible for processing the parameters related to short-term correlation of linear prediction (LP). Then, the parameters that may be included in the parameter set Pa(n) and the definition of various parameters are shown as follows.

(1) Short-term correlation parameters of the target voice frame are as follows.

First, a p-order filter is defined and shown in the following formula 1.1:

$$A_p(z)=1+a_1z^{-1}+a_2z^{-2}+\ldots+a_pz^{-p} \quad \text{Formula 1.1}$$

In the formula 1.1, p is an order of the filter. For the LPC filter, $a_j(1\le j\le p)$ represents an LPC coefficient. For the LTP filter, $a_j(1\le j\le p)$ represents an LTP coefficient, where j is an integer, and a represents a voice signal. Since the LPC filter is responsible for processing the parameters related to the short-term correlation of the LP, the short-term correlation parameters of the target voice frame may be considered as parameters related to the LPC filter. The LPC filter is implemented based on LP analysis. The LP analysis refers to that when or in response to determining that the LPC is used to filter the target voice frame, a filtering result of the nth voice frame is obtained by convolving p historical voice frames before the nth voice frame with the p-order filter shown in the formula 1.1, which conforms to the short-term correlation characteristic of voice. The order of the LPC filter may be set based on experience. For example, in a scenario having Fs=8000 Hz, an order p of the LPC filter is 10, and in a scenario having Fs=16000 Hz, the order p of the LPC filter is 16.

In an example shown in this embodiment, Fs=16000 Hz, and then p=16. The p-order filter may further be decomposed into the following formula 1.2:

$$A_p(z)=\frac{P(z)+Q(z)}{2} \quad \text{Formula 1.2}$$

$$P(z)=A_p(z)-z^{-(p+1)}A_p(z^{-1}) \quad \text{Formula 1.3}$$

$$Q(z)=A_p(z)+z^{-(p+1)}A_p(z^{-1}) \quad \text{Formula 1.4}$$

In a physical sense, P(z) shown in the formula 1.3 represents the periodic change law of glottis opening, Q(z) shown in the formula 1.4 represents the periodic change law of glottis closing, and P(z) and Q(z) jointly represent the periodic change law of glottis opening and closing.

Roots formed by the decomposition of two polynomials P(z) and Q(z) alternately appear in a complex plane, and therefore are named a line spectral frequency (LSF). The LSF is represented as a series of angular frequencies $w_k$ of the roots of P(z) and Q(z) distributed on a unit circle on the complex plane. Assuming that the roots of P(z) and Q(z) on the complex plane are defined as $\theta_k$, the angular frequencies corresponding to the root are defined as the following formula 1.5:

$$w_k=\tan^{-1}\left(\frac{Re\{\theta_k\}}{Im\{\theta_k\}}\right) \quad \text{Formula 1.5}$$

In the formula 1.5, $Re\{\theta_k\}$ represents a real number of $\theta_k$, and $Im\{\theta_k\}$ represents an imaginary number of $\theta_k$.

An LSF(n) of the nth voice frame may be calculated from the formula 1.5. The LSF is a parameter correlated to the short-term correlation of voice, so that the LSF(n) can be used as a type of parameter in the parameter set Pa(n). In the embodiment of the present disclosure, the voice frame may be divided. That is to say, the nth voice frame is divided into k daughter frames, and then the LSF(n) of the nth voice frame may be correspondingly divided into the LSFs respectively corresponding to the k daughter frames. In an example shown in this embodiment, the nth voice frame is divided into two daughter frames: a daughter frame of first 10 ms and a daughter frame of last 10 ms. Then the LSF(n) of the nth voice frame may be correspondingly divided into an LSF1(*n*) of the first daughter frame and an LSF2(*n*) of the second daughter frame.

Then, in order to further simplify the computation complexity, in some embodiments, LSFk(n) of a kth daughter frame of the nth voice frame may be obtained by using the formula 1.5. Then interpolation may be performed according to the LSFk(n) and an interpolation factor of the nth voice frame to obtain an LSF of a daughter frame different from the kth daughter frame in the nth voice frame. The parameters desired for the interpolation may further include LSFk (n−1) of the kth daughter frame of the (n−1)th voice frame. By using k=2 as an example, the LSF2(*n*) of the second daughter frame of the nth voice frame may be obtained by using the formula 1.5. Then the LSF1(*n*) of the first daughter frame of the nth voice frame is obtained by interpolation based on an LSF2(*n*−1) of the second daughter frame of the (n−1)th voice frame and the LSF2(*n*) of the second daughter frame of the nth voice frame, and the interpolation factor is expressed as $\alpha_{lsf}(n)$. In this way, a parameter I and a parameter II included in the parameter set Pa(n) are obtained. The parameter I refers to the LSF2(*n*) of the second daughter frame (that is, the kth daughter frame) of the target voice frame. The LSF2(*n*) includes 16 LSF coefficients. The parameter II refers to an interpolation factor $\alpha_{lsf}$(n) of the target voice frame. The interpolation factor $\alpha_{lsf}$(n) may include 5 candidate values, which are respectively 0, 0.25, 0.5, 0.75, and 1.0.

(2) Long-Term Correlation Parameters of the Target Voice Frame

Since the LTP filter is responsible for processing parameters related to the long-term correlation of the pitch lag, the long-term correlation parameters of the target voice frame may be considered as parameters related to the LTP filter. The LTP filter reflects long-term correlation of the voice frame (especially the voiced frame), and the long-term correlation is correlated to the pitch lag of the voice frame. The pitch lag reflects quasi-periodicity of the voice frame. That is to say, when or in response to determining that it is desirable to predict the pitch lag of the sample points in the target voice frame, the pitch lag of the sample points in the historical voice frame may be fixed, and then LTP filtering is performed on the fixed pitch lag based on the quasi-periodicity. Therefore, a parameter III and a parameter IV in the parameter set Pa(n) are defined. The target voice frame including m subframes is used as an example. The long-term correlation parameter of the target voice frame includes a pitch lag of each subframe of the target voice frame and an LTP coefficient of each subframe, m being a positive integer. In an example shown in this embodiment, m=4, the parameter set Pa(n) may include the parameter III and the parameter IV. The parameter III refers to the pitch lags respectively corresponding to 4 subframes of the target voice frame, which are respectively denoted as pitch(n, 0), pitch(n, 1), pitch(n, 2), and pitch(n, 3). The parameter IV refers to the LTP coefficients respectively corresponding to the 4 subframes of the target voice frame. The LTP filter is a 5-order filter by way of example. Each subframe of the target voice frame corresponds to 5 LTP coefficients, and then the parameter IV includes 20 LTP coefficients in total.

(3) Energy Parameters Gain(n) of the Target Voice Frame

Energy of different voice frames is not necessarily the same, and the energy can be represented by a gain value of each subframe of the voice frame, so that a parameter V in the parameter set Pa(n) is defined. The parameter V refers to the energy parameters gain(n) of the target voice frame. In an example shown in this embodiment, the target voice frame includes 4 subframes having a frame length of 5 ms. The energy parameters gain(n) of the target voice frame include gain values respectively corresponding to the 4 subframes, which are respectively gain(n, 0), gain(n, 1), gain(n, 2), and gain(n, 3). Signal amplification is performed, by using the gain(n), on the target voice frame obtained by filtering by the reconstruction filter. In this way, the reconstructed target voice frame may be amplified to an energy level of an original voice signal, thereby restoring a more accurate target voice frame.

Figure 7:
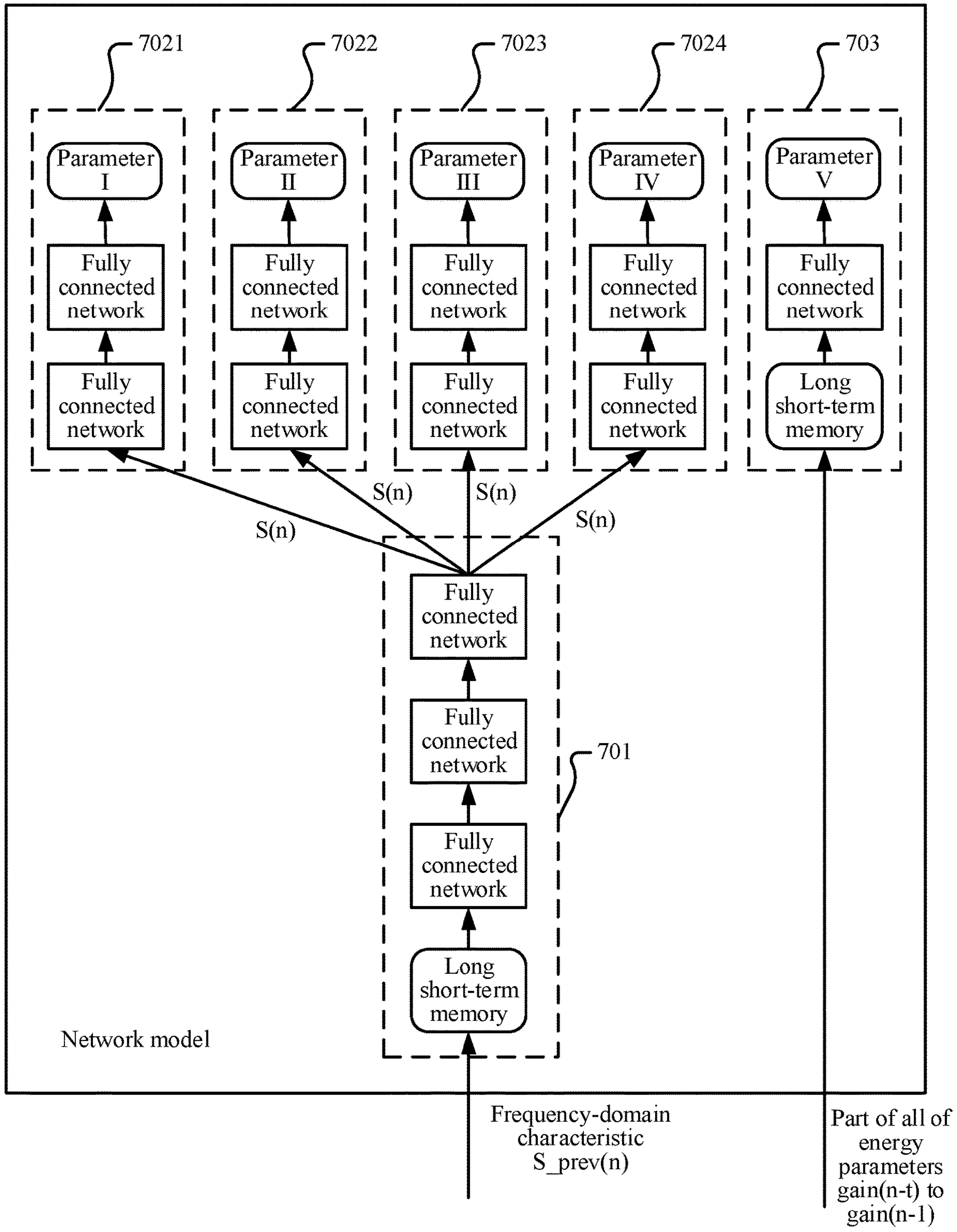
FIG. 7 is a schematic structural diagram of a network model according to embodiment(s) of the present disclosure.

Referring to step S504, in the embodiment of the present disclosure, the parameter set Pa(n) of the nth voice frame is predicted by invoking the network model. Considering the diversity of parameters, the manner of using different network structures for different parameters is adopted. That is to say, the network structure of the network model is determined by the types of the parameters desired to be included in the parameter set Pa(n). For example, the network model includes a plurality of NNs. A number of the NNs is determined based on the types of the parameters desired to be included in the parameter set Pa(n). Based on various parameters that may be included in the parameter set Pa(n), FIG. 7 shows a schematic structural diagram of a network model according to an embodiment of the present disclosure. As shown in FIG. 7, the network model may include a first NN 701 and a plurality of second NNs. Each of the second NNs belongs to a sub-network of the first NN, that is, an output of the first NN serves as an input of the each second NN. The each second NN is connected to the first NN 701. The each second NN corresponds to a parameter in the parameter set. That is to say, the each second NN may be configured to predict a parameter in the parameter set Pa(n). It can be seen that the number of the second NNs is determined according to the types of the parameters desired to be included in the parameter set.

In some embodiments, the first NN 701 includes a long short-term memory (LSTM) network and three fully connected (FC) networks. The FC network is also referred to as an FC layer. The first NN 701 is configured to predict a virtual frequency-domain characteristic S(n) of the target voice frame (that is, the nth voice frame). That is to say, an input of the first NN 701 is the frequency-domain characteristic S_prev(n) of the historical voice frame obtained in step S503, and the output is the virtual frequency-domain characteristic S(n) of the target voice frame. In an example shown in this embodiment, the virtual frequency-domain characteristic of the target voice frame may be a virtual frequency-domain coefficient or a virtual amplitude spectrum. For example, S(n) may be a sequence of amplitude coefficients of virtual 322-dimensional STFT coefficients of the predicted nth voice frame. In an example shown in this embodiment, the LSTM in the first NN 701 includes 1 hidden layer and 256 processing units. A first FC layer in the first NN 701 includes 512 processing units and activation functions. A second FC layer in the first NN 701 includes 512 processing units and activation functions. A third FC layer in the first NN 701 includes 322 processing units. The 322 processing units are configured to output the sequence of amplitude coefficients of the virtual 322-dimensional STFT coefficients of the target voice frame. Each of the 322 processing units is configured to output the amplitude spectra of one dimension in the virtual 322-dimensional amplitude coefficient sequence. The following can be deduced by analogy.

The second NN is configured to predict parameters of the target voice frame. The input of the second NN is the virtual frequency-domain characteristic S(n) of the target voice frame outputted by the first NN 701, and the output is used for reconstructing a parameter of the target voice frame. In an example shown in this embodiment, each second NN includes two FC layers, and the last FC layer does not include the activation function. The parameters to be predicted by different second NNs are different, and the included FC structures are also different. For example, ① in two FC layers of the second NN 7021 configured to predict the parameter I, the first FC layer includes 512 processing units and activation functions, the second FC layer includes 16 processing units, and the 16 processing units are configured to output the parameter I, that is, 16 LSF coefficients. ② In two FC layers of the second NN 7022 configured to predict the parameter II, the first FC layer includes 256 processing units and activation functions, the second FC layer includes 5 processing units, and the 5 processing units are configured to output the parameter II, that is, 5 candidate values of the interpolation factor. ③ In two FC layers of the second NN 7023 configured to predict the parameter III, the first FC layer includes 256 processing units and activation functions, the second FC layer includes 4 processing units, and the 4 processing units are configured to output the parameter III, that is, pitch lags respectively corresponding to 4 subframes. ④ In two FC layers of the second NN 7024 configured to predict the parameter IV, the first FC layer includes 512 processing units and activation functions, the second FC layer includes 20 processing units, and the 20 processing units are configured to output the parameter IV, that is, 20 LTP coefficients.

Based on the network model shown in FIG. 7, in some embodiments, step S504 may be implemented by using steps S11-S13.

S11: Invoke the first NN 701 to predict the frequency-domain characteristic S_prev(n) of the historical voice frame, to obtain the virtual frequency-domain characteristic S(n) of the target voice frame.

S12: Invoke the second NN to predict the virtual frequency-domain characteristic S(n) of the target voice frame, to obtain parameters corresponding to the second NN. For example, the second NNs 7021-7024 are invoked to respectively predict the virtual frequency-domain characteristic S(n) of the target voice frame. In this way, each of the second NNs 7021-7024 outputs a parameter.

S13: Establish the parameter set Pa(n) of the target voice frame according to the parameters respectively corresponding to the plurality of second NNs. For example, the second NN 7021 corresponds to the parameter I, the second NN 7022 corresponds to the parameter II, the second NN 7023 corresponds to the parameter III, and the second NN 7024 corresponds to the parameter IV. Based on the parameter I, the parameter II, the parameter III, and the parameter IV, the parameter set Pa(n) of the target voice frame may be established.

Still referring to FIG. 7, the network model may further include a third NN 703. The third NN and the first NN (or the second NN) belong to a parallel network. The third NN 703 includes an LSTM layer and an FC layer. Based on the network model shown in FIG. 7, in some embodiments, S13 may be implemented by using steps S14-S16.

- S14: Acquire an energy parameter of the historical voice frame.
- S15: Invoke the third NN to predict the energy parameter of the historical voice frame, to obtain an energy parameter of the target voice frame, the target voice frame including m subframes, the energy parameter of the target voice frame including a gain value of each subframe of the target voice frame, and m being a positive integer.
- S16: Establish the parameter set Pa(n) of the target voice frame according to the parameters respectively corresponding to the plurality of second NNs and the energy parameter of the target voice frame.

In steps S14-S15, the energy parameters of part or all of the voice frames in the historical voice frame may be used for predicting the energy parameter of the target voice frame. In this embodiment, the energy parameter of the historical voice frame includes an energy parameter of the (n−1)th voice frame and an energy parameter of an (n−2)th voice frame by way of example for description. For ease of description, the energy parameter of the (n−1)th voice frame is denoted as gain(n−1), and the energy parameter of the (n−2)th voice frame is denoted as gain(n−2). In an example shown in this embodiment, m=4, that is, each voice frame includes 4 subframes having the frame length of 5 ms. Then, the energy parameter gain(n−1) of the (n−1)th voice frame includes gain values respectively corresponding to the 4 subframes of the (n−1)th voice frame, which are respectively expressed as gain(n−1, 0), gain(n−1, 1), gain(n−1, 2), and gain(n−1, 3). In certain embodiment(s), the energy parameter gain(n−2) of the (n−2)th voice frame includes gain values respectively corresponding to the 4 subframes of the (n−2)th voice frame, which are respectively expressed as gain(n−2, 0), gain(n−2, 1), gain(n−2, 2), and gain(n−2, 3). In certain embodiment(s), the energy parameter gain(n) of the nth voice frame includes the gain values respectively corresponding to the 4 subframes of the nth voice frame, which are respectively expressed as gain(n, 0), gain(n, 1), gain(n, 2), and gain(n, 3). In an example shown in this embodiment, the LSTM in the third NN includes 128 processing units. The FC layer includes 4 processing units and activation functions. The 4 processing units are configured to output the parameter V, that is, the gain values respectively corresponding to the 4 subframes of the nth voice frame. Each of the 4 processing units is configured to output the gain value of one subframe.

Referring to the network structure of the network model shown in FIG. 7, after the types of the parameters desired to be included in the parameter set Pa(n) are determined according to actual requirements, the network structure of the network model can be correspondingly configured. For example, when or in response to determining that it is determined, according to actual requirements, that the parameter set Pa(n) may include the parameter I, the parameter II, and the parameter V, the network structure of the network model includes the first NN 701, the second NN 7021, the second NN 7022, and the third NN 703. For another example, when or in response to determining that it is determined, according to actual requirements, that the parameter set Pa(n) may simultaneously include the parameter I to parameter V, the network structure of the network model may be configured according to FIG. 7. After the network structure of the network model is configured, a deep learning method may be used for training the network model to obtain a network model φ. Then the frequency-domain characteristic S_prev(n) of the historical voice frame is predicted by using the network model φ. In addition, the energy parameters (for example, gain(n−1) and gain(n−2)) of the historical voice frame may further be predicted. Finally, the parameter set Pa(n) of the target voice frame can be obtained.

S505: Establish a reconstruction filter according to the parameter set.

After the parameter set Pa(n) of the target voice frame is obtained, various parameters in the parameter set Pa(n) may be used to establish the reconstruction filter, and the subsequent process of reconstructing the target voice frame is performed. As described above, the reconstruction filter includes at least one of the LTP filter or the LPC filter. The LTP filter may be established by using long-term correlation parameters (including the parameter III and the parameter IV) of the target voice frame. The LPC filter may be established by using the short-term correlation parameters (including the parameter I and the parameter II) of the target voice frame. Referring to the formula 1.1, the establishment of the filter is to determine corresponding coefficients of the filter. The establishment of the LTP filter is to determine the LTP coefficient, and the parameter IV includes the LTP coefficient, so that the LTP filter can be conveniently established based on the parameter IV.

The establishment of the LPC filter is to determine the LPC coefficient. A process of determining the LPC coefficient is as follows.

First, the parameter I refers to the LSF2(*n*) of the second daughter frame of the target voice frame, which includes 16 LSF coefficients in total. The parameter II refers to an interpolation factor $\alpha_{lsf}$ (n) of the target voice frame, and may include 5 candidate values, which are respectively 0, 0.25, 0.5, 0.75, and 1.0. Then, the LSF1(*n*) of the first daughter frame of the target voice frame may be obtained by interpolation. A specific calculation formula is shown in the following formula 1.6:

$$LSF1(n)=(1-\alpha_{LSF}(n))\cdot LSF2(n-1)+\alpha_{LSF}(n)\cdot LSF2(n) \quad \text{Formula 1.6}$$

The formula 1.6 shows that the LSF1(*n*) of the first daughter frame of the target voice frame is obtained by performing weighted summation on the LSF2(*n*−1) of the second daughter frame of the (n−1)th voice frame and the LSF2(*n*) of the second daughter frame of the target voice frame. A weight value (weight) used by performing weighted summation is the candidate value of the interpolation factor.

Next, it may be learned from related deduction according to the formulas 1.1-1.5 that the LPC coefficients are correlated with the LSF coefficients. By integrating the formulas 1.1-1.5, 16-order LPC coefficients (that is, LPC1(*n*)) of the first daughter frame of the first 10 ms of the target voice frame and 16-order LPC coefficients (that is, LPC2(*n*)) of the second daughter frame of the last 10 ms of the target voice frame can be respectively obtained.

The LPC coefficients may be determined by the process, so that the LPC filter can be established.

S506: Acquire an excitation signal of the target voice frame.

S507: Filter the excitation signal of the target voice frame by using the reconstruction filter, to obtain the target voice frame.

Figure 8:
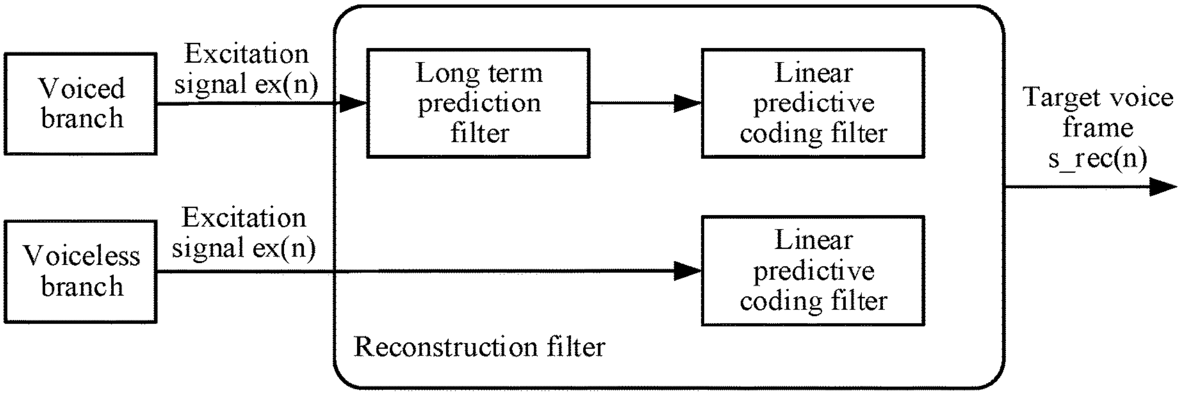
FIG. 8 is a schematic structural diagram of a voice generation model based on an excitation signal according to embodiment(s) of the present disclosure.

FIG. 8 is a schematic structural diagram of a voice generation model based on an excitation signal according to an embodiment of the present disclosure. A physical basis of a voice generation model based on the excitation signal is a process of generating human voice. The process of generating human voice may be roughly divided into two sub-processes. (1) When or in response to determining that a person vocalizes, a noise-like shock signal with certain energy is generated at the trachea of the person. This shock signal corresponds to the excitation signal. The excitation signal is a set of sequences with fault-tolerant capabilities. (2) The shock signal shocks the vocal cord of the person to generate quasi-periodic opening and closing, and a sound is made after being amplified by oral cavity. This process corresponds to the reconstruction filter. A working mechanism of the reconstruction filter is to simulate the process to construct a sound. The sound is divided into an unvoiced sound and a voiced sound. The voiced sound refers to a sound generated by the vibration of the vocal cord during the sound making, and the unvoiced sound refers to a sound generated when or in response to determining that the vocal cord does not vibrate. Considering the characteristics of the sound, in the embodiment of the present disclosure, the process of generating human voice is refined. (3) The LTP filter and the LPC filter are used during the reconstruction for such a quasi periodic signal such as the voiced sound, and the excitation signal respectively shocks (excites) the LTP filter and the LPC filter. (4) Only the LPC filter is used during the reconstruction for such an aperiodic signal such as the unvoiced sound, and the excitation signal only shocks the LPC filter.

The excitation signal is a set of sequences, which serves as a driving source to shock (or excite) the reconstruction filter to generate the target voice frame. In step S506 in the embodiment of the present disclosure, the excitation signal of the historical voice frame may be acquired, and the excitation signal of the target voice frame is determined according to the excitation signal of the historical voice frame.

In some embodiments, in step S506, the excitation signal of the target voice frame may be estimated by using a multiplexing mode. The multiplexing mode may be shown in the following formula 1.7:

$$ex(n)=ex(n-1) \quad \text{Formula 1.7}$$

In the formula 1.7, ex(n−1) represents the excitation signal of the (n−1)th voice frame, and ex(n) represents the excitation signal of the target voice frame (that is, the nth voice frame).

In some embodiments, in step S506, the excitation signal of the target voice frame may be estimated by performing averaging, and the averaging formula may be shown in the following formula 1.8:

$$ex(n)=\frac{\sum_{i=1}^{t} ex(n-i)}{t} \quad \text{Formula 1.8}$$

The formula 1.8 is to average the excitation signals of the voice frames in the (n−t)th voice frame to the (n−1)th voice frame to obtain the excitation signal ex(n) of the target voice frame (that is, the nth voice frame). In the formula 1.8, ex(n−i) (1≤i≤t) represents the excitation signal of each of the (n−t)th voice frame to the (n−1)th voice frame.

In some embodiments, in step S506, the excitation signal of the target voice frame may be estimated by performing weighted sum, and the weighted summation may be shown in the following formula 1.9:

$$ex(n)=\sum_{i=1}^{t}\propto_i\cdot ex(n-i) \quad \text{Formula 1.9}$$

The formula 1.9 is to perform weighted summation on the excitation signals of the voice frames in the (n−t)th voice frame to the (n−1)th voice frame to obtain the excitation signal ex(n) of the target voice frame (that is, the nth voice frame). In the formula 1.9, $\propto_i$ represents a weight corresponding to the excitation signal of each voice frame, and may be set according to actual requirements. By using t=5 as an example, a combination of weights may be shown in the following table:

| Item | Weight |
|---|---|
| $\propto_1$ | 0.40 |
| $\propto_2$ | 0.30 |
| $\propto_3$ | 0.15 |
| $\propto_4$ | 0.10 |
| $\propto_5$ | 0.05 |

Referring to FIG. 8, in some embodiments, when or in response to determining that the target voice frame is the aperiodic signal such as the unvoiced frame, the reconstruction filter may only include the LPC filter. That is to say, the excitation signal of the target voice frame is filtered by using only the LPC filter. The parameter set Pa(n) may include the parameter I and the parameter II, and may further include the parameter V. Then, in step S507, the process of generating the target voice frame refers to the process of the LPC filtering stage, which is to be described in detail.

First, the parameter I refers to the LSF2(*n*) of the second daughter frame of the target voice frame, which includes 16 LSF coefficients in total. The parameter II refers to an interpolation factor $\alpha_{lsf}(n)$ of the target voice frame, and may include 5 candidate values, which are respectively 0, 0.25, 0.5, 0.75, and 1.0. Then the LSF1(*n*) of the first daughter frame of the target voice frame may be obtained by calculation by using the formula 1.6.

Next, it may be learned from related deduction according to the formulas 1.1-1.5 that the LPC coefficients are correlated with the LSF coefficients. By integrating the formulas 1.1-1.5, 16-order LPC coefficients (that is, LPC1(*n*)) of the first daughter frame of the first 10 ms of the target voice frame and 16-order LPC coefficients (that is, LPC2(*n*)) of the second daughter frame of the last 10 ms of the target voice frame can be respectively obtained.

Third, under the shocking of the excitation signal of the target voice frame, LPC filtering is performed on LPC1(*n*) to reconstruct the first daughter frame (that is, the first 10 ms of the target voice frame) of the target voice frame. The first daughter frame includes 160 sample points. On this basis, the energy parameters of the first daughter frame may be invoked, that is, gain values respectively corresponding to some or all subframes included in the first daughter frame, and signal amplification is performed on the reconstructed first daughter frame. For example, the first daughter frame of the target voice frame includes two subframes. The gain values are respectively gain(n, 0) and gain(n, 1). Then the signal amplification is performed on the reconstructed first daughter frame according to the gain value gain(n, 0) of the first subframe included in the first daughter frame. In addition, the signal amplification is performed on the reconstructed second daughter frame according to the gain value gain(n, 1) of the second subframe included in the first daughter frame. In this way, the signal amplification is performed on some or all of the 160 sample points included in the first daughter frame, to obtain first 160 sample points of the reconstructed target voice frame.

In certain embodiment(s), under the shocking of the excitation signal of the target voice frame, LPC filtering is performed on LPC2(*n*) to reconstruct the second daughter frame (that is, last 10 ms of the target voice frame) of the target voice frame. The second daughter frame includes 160 sample points. On this basis, the gain values (for example, gain(n, 2) and gain(n, 3)) respectively corresponding to all subframes included in the second daughter frame may be invoked to perform the signal amplification on the sample points in the corresponding reconstructed subframe. Therefore, the signal amplification is performed on some or all of the 160 sample points included in the second daughter frame, to obtain last 160 sample points of the reconstructed target voice frame.

Finally, the reconstructed first daughter frame (corresponding to the first 10 ms of the target voice frame) and the reconstructed second daughter frame (corresponding to the last 10 ms of the target voice frame) are synthesized to obtain the reconstructed target voice frame.

During the LPC filtering, the LSF coefficients of the (n−1)th voice frame are used for the LPC filtering of the nth voice frame. In other words, the LPC filtering of the nth voice frame may be implemented by using the historical voice frame adjacent to the nth voice frame, which confirms the short-term correlation characteristics of the LPC filtering.

In some embodiments, when or in response to determining that the target voice frame is the quasi periodic signal such as the voiced frame, the reconstruction filter includes the LPC filter and the LTP filter. That is to say, the excitation signal of the target voice frame is filtered by using both the LTP filter and the LPC filter. The parameter set Pa(n) may include the parameter I, the parameter II, the parameter III, and the parameter IV, and may further include the parameter V. Then in step S507, the process of generating the target voice frame may be shown as follows.

(I) LTP Filtering Stage

First, the parameter III includes pitch lags respectively corresponding to 4 subframes, which are respectively pitch (n, 0), pitch(n, 1), pitch(n, 2), and pitch(n, 3). The following processing is performed for the pitch lag of each subframe. ① The pitch lag of the subframe is compared with a preset (default) threshold. When or in response to determining that the pitch lag of the subframe is less than the preset threshold, the pitch lag of the subframe is set to 0, and the step of LTP filtering is skipped. ② When or in response to determining that the pitch lag of the subframe is not less than the preset threshold, a historical sample point corresponding to the subframe is used. Under the shocking of the excitation signal of the target voice frame, the LTP filtering is performed on the LTP coefficient of the subframe and the historical sample point. The order of the LTP filter is 5 by way of example. The 5-order LTP filter is invoked to perform LTP filtering on the LTP coefficient of the subframe and the historical sample point, to obtain an LTP filtering result of the subframe. Since the LTP filtering reflects the long-term correlation of the voice frame, and the long-term correlation is correlated with the pitch lag, in the LTP filtering involved in step ②, the historical sample point corresponding to the subframe is selected according to the pitch lag of the subframe. For example, the subframe is used as a starting point, and a same number of sample points as the values of the pitch lags are traced back (traced forward) as the historical sample point corresponding to the subframe. For example, the value of the pitch lag of the subframe is 100, the historical sample point corresponding to the subframe includes 100 sample points traced back by using the subframe as the starting point. It may be seen that, for the setting of the historical sample point corresponding to the subframe according to the pitch lag of the subframe, sample points included in a historical subframe (such as the last subframe having the frame length of 5 ms) before the subframe are actually used to perform LTP filtering, which confirms the long-term correlation characteristics of the LPC filtering.

Then, for each daughter frame included in the target voice frame, the LTP filtering results of the subframes included in the daughter frame are synthesized to obtain an LTP synthesis signal of the daughter frame. For example, the target voice frame includes two daughter frames and four subframes. The first daughter frame includes a first subframe and a second subframe. The second daughter frame includes a third subframe and a fourth subframe. For the first daughter frame (such as first 10 ms of the target voice frame) of the target voice frame, an LTP filtering result of the first subframe and an LTP filtering result of the second subframe are synthesized to obtain an LTP synthesis signal of the first daughter frame. For the second daughter frame (such as last 10 ms of the target voice frame) of the target voice frame, an LTP filtering result of the third subframe and an LTP filtering result of the fourth subframe are synthesized to obtain an LTP synthesis signal of the second daughter frame. At this point, the processing of the LTP filtering stage is performed.

(II) LPC Filtering Stage

Referring to the processing process of the LPC filtering stage in the embodiment, 16-order LPC coefficients of the first daughter frame of the target voice frame are first determined based on the parameter I and the parameter II, that is, LPC1($n$), and 16-order LPC coefficients of the second daughter frame of the target voice frame are also determined, that is, LPC2($n$).

Then, under the shocking of the excitation signal of the target voice frame, the LPC filtering is performed by using both the LTP synthesis signal of the first daughter frame of the target voice frame obtained at the LTP filtering stage and LPC1($n$), to reconstruct the first daughter frame (that is, the first 10 ms of the target voice frame, including 160 sample points) of the target voice frame. On this basis, the gain values (for example, gain(n, 0) and gain(n, 1)) respectively corresponding to some or all of the subframes included in the first daughter frame may be invoked to perform the signal amplification on the reconstructed first daughter frame.

In certain embodiment(s), under the shocking of the excitation signal of the target voice frame, the LPC filtering is performed by using both the LTP synthesis signal of the second daughter frame of the target voice frame obtained at the LTP filtering stage and LPC2($n$), to reconstruct the second daughter frame (that is, the last 10 ms of the target voice frame, including 160 sample points) of the target voice frame. On this basis, the gain values (for example, gain(n, 2) and gain(n, 3)) respectively corresponding to some or all of the subframes included in the second daughter frame may be invoked to perform the signal amplification on the reconstructed second daughter frame.

Finally, the reconstructed first daughter frame (corresponding to the first 10 ms of the target voice frame) and the reconstructed second daughter frame (corresponding to the last 10 ms of the target voice frame) are synthesized to obtain the reconstructed target voice frame.

Through the description of this embodiment, when or in response to determining that the PLC is desired to be performed on the nth voice frame in the voice signal, the nth voice frame may be reconstructed based on the voice processing method of this embodiment. When or in response to determining that packet loss occurs, for example, the (n+l)th voice frame and the (n+2)th voice frame are both lost, reconstruction (restoration) of the (n+l)th voice frame, the (n+2)th voice frame, and the like may be performed according to the process, so as to implement the PLC and ensure the quality of voice calls.

In the embodiment of the present disclosure, when or in response to determining that the target voice frame in the voice signal may be reconstructed, the network model may be invoked to predict the frequency-domain characteristic of the historical voice frame corresponding to the target voice frame to obtain the parameter set of the target voice frame, and then the target voice frame is reconstructed by performing inter-parameter filtering on the parameter set. The process of voice reconstruction (restoration) is combined with the deep learning technology, so that the voice processing capability is improved. The parameter set of the target voice frame is predicted by performing deep learning on the historical voice frame, and then the target voice frame is reconstructed according to the parameter set of the target voice frame. In this way, the reconstruction process is convenient and efficient and is applicable to a communication scenario with high real-time requirements. In addition, the parameter set used for reconstructing the target voice frame includes a plurality of types of parameters. In this way, learning objectives of the network model are divided, that is, the learning objectives are divided into a plurality of parameters. Each parameter corresponds to different NNs for learning. According to different parameter sets, different NNs can be flexibly configured and combined to form the structure of the network model. In such a manner, the network structure can be greatly simplified, and the processing complexity can be effectively reduced. The PLC is supported, that is, when or in response to determining that the plurality of voice frames are lost, the reconstruction of the plurality of voice frames can be implemented, so that the quality of voice calls is ensured.

Figure 9:
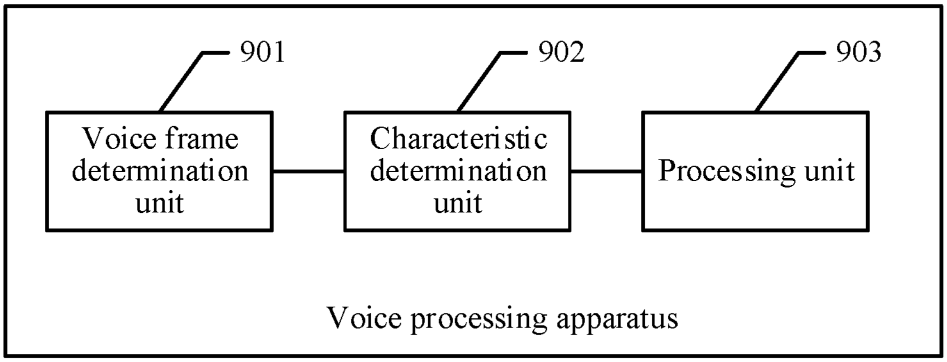
FIG. 9 is a schematic structural diagram of a voice processing apparatus according to embodiment(s) of the present disclosure.

FIG. 9 is a schematic structural diagram of a voice processing apparatus according to an embodiment of the present disclosure. The voice processing apparatus may be a computer program or a computer program product (including program code) run in a terminal or a server. For example, the voice processing apparatus may be an application program (such as an App for providing a VoIP call function in the terminal) in the terminal or the server. The terminal or the server running the voice processing apparatus may serve as the receiving terminal shown in FIG. 1 or FIG. 2. The voice processing apparatus may be configured to perform part or all of the steps in the method embodiments shown in FIG. 4 and FIG. 5. Referring to FIG. 9, the voice processing apparatus includes the following units: a voice frame determination unit 901, configured to determine a historical voice frame corresponding to a to-be-processed target voice frame; a characteristic determination unit 902, configured to determine a frequency-domain characteristic of the historical voice frame; and a processing unit 903, configured to: invoke a network model to predict the frequency-domain characteristic of the historical voice frame, to obtain a parameter set of the target voice frame, the parameter set including a plurality of types of parameters, the network model including a plurality of NNs, and a number of the types of the parameters in the parameter set being determined according to a number of the NNs; and reconstruct the target voice frame according to the parameter set.

In some embodiments, the characteristic determination unit 902 is further configured to perform time-frequency transform on the historical voice frame to obtain a frequency-domain coefficient corresponding to the historical voice frame; and use the frequency-domain coefficient or an amplitude spectrum extracted from the frequency-domain coefficient as the frequency-domain characteristic of the historical voice frame.

In some embodiments, the network model includes a first NN and a plurality of second NNs. The processing unit 903 is further configured to: invoke the first NN to predict the frequency-domain characteristic of the historical voice frame, to obtain a virtual frequency-domain characteristic of the target voice frame; invoke the second NNs to predict the virtual frequency-domain characteristic of the target voice frame, to obtain parameters corresponding to the second NNs; and establish the parameter set of the target voice frame according to the parameters respectively corresponding to the plurality of second NNs.

In some embodiments, the network model includes a third NN. The processing unit 903 is further configured to: acquire an energy parameter of the historical voice frame; invoke the third NN to predict the energy parameter of the historical voice frame, to obtain an energy parameter of the target voice frame; and establish the parameter set of the target voice frame according to the parameters respectively corresponding to the plurality of second NNs and the energy parameter of the target voice frame. The target voice frame includes m subframes, and the energy parameter of the target voice frame includes a gain value of each subframe of the target voice frame, m being a positive integer.

In some embodiments, the processing unit 903 is further configured to: establish a reconstruction filter according to the parameter set; acquire an excitation signal of the target voice frame; and filter the excitation signal of the target voice frame according to the reconstruction filter, to obtain a reconstructed target voice frame.

In some embodiments, the processing unit 903 is further configured to: acquire an excitation signal of the historical voice frame; and determine the excitation signal of the target voice frame according to the excitation signal of the historical voice frame.

In some embodiments, the target voice frame refers to the nth voice frame in the voice signal transmitted by the VoIP system. The historical voice frame includes the (n−t)th voice frame to the (n−1)th voice frame in the voice signal transmitted by the VoIP system, n and t being both positive integers.

In some embodiments, the excitation signal of the historical voice frame includes an excitation signal of the (n−1)th voice frame. The processing unit 903 is further configured to determine the excitation signal of the (n−1)th voice frame as the excitation signal of the target voice frame.

In some embodiments, the excitation signal of the historical voice frame includes an excitation signal of each of the (n−t)th voice frame to the (n−1)th voice frame. The processing unit 903 is further configured to average the excitation signals of the voice frames in the (n−t)th voice frame to the (n−1)th voice frame to obtain the excitation signal of the target voice frame.

In some embodiments, the excitation signal of the historical voice frame includes the excitation signal of each of the (n−t)th voice frame to the (n−1)th voice frame. The processing unit 903 is further configured to perform weighted summation on the excitation signals of the voice frames in the (n−t)th voice frame to the (n−1)th voice frame to obtain the excitation signal of the target voice frame.

In some embodiments, when or in response to determining that the target voice frame is the unvoiced frame, the parameter set includes the short-term correlation parameter of the target voice frame. The reconstruction filter includes the LPC filter. The target voice frame includes k daughter frames. The short-term correlation parameter of the target voice frame includes an LSF of a kth daughter frame of the target voice frame and an interpolation factor of the target voice frame, k being an integer greater than 1.

In some embodiments, when or in response to determining that the target voice frame is the voiced frame, the parameter set includes the short-term correlation parameter of the target voice frame and the long-term correlation parameter of the target voice frame. The reconstruction filter includes the LTP filter and the LPC filter. The target voice frame includes k daughter frames. The short-term correlation parameter of the target voice frame includes the LSF of the kth daughter frame of the target voice frame and the interpolation factor of the target voice frame, k being the integer greater than 1. The target voice frame includes m subframes. The long-term correlation parameter of the target voice frame includes a pitch lag of each subframe of the target voice frame and an LTP coefficient of each subframe of the target voice frame, m being a positive integer.

Figure 10:
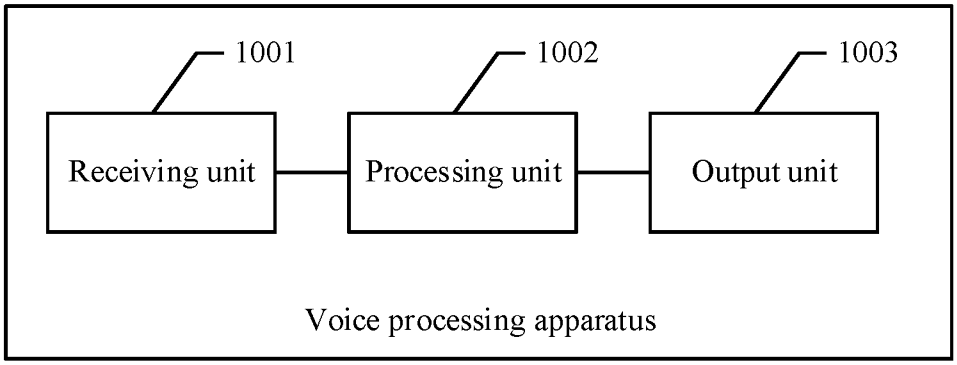
FIG. 10 is a schematic structural diagram of a voice processing apparatus according to embodiment(s) of the present disclosure.

FIG. 10 is a schematic structural diagram of a voice processing apparatus according to an embodiment of the present disclosure. The voice processing apparatus may be a computer program or a computer program product (including program code) run in a terminal or a server. For example, the voice processing apparatus may be an application program (such as an App for providing a VoIP call function in the terminal) in the terminal or the server. The terminal or the server running the voice processing apparatus may serve as the receiving terminal shown in FIG. 1 or FIG. 2. The voice processing apparatus may be configured to perform part or all of the steps in the method embodiment shown in FIG. 3. Referring to FIG. 10, the voice processing apparatus includes the following units: a receiving unit 1001, configured to receive a voice signal transmitted by a VoIP system; a processing unit 1002, configured to reconstruct a target voice frame in the voice signal by using the method shown in FIG. 4 or FIG. 5 when or in response to determining that the target voice frame is lost; and an output unit 1003, configured to output the voice signal based on the reconstructed target voice frame.

In some embodiments, the processing unit 1002 is further configured to: acquire redundant information of the target voice frame; reconstruct the target voice frame in the voice signal according to the redundant information of the target voice frame when or in response to determining that the target voice frame is lost; and reconstruct the target voice frame by using the method shown in FIG. 4 or FIG. 5 when or in response to determining that the reconstruction of the target voice frame according to the redundant information of the target voice frame fails.

Figure 11:
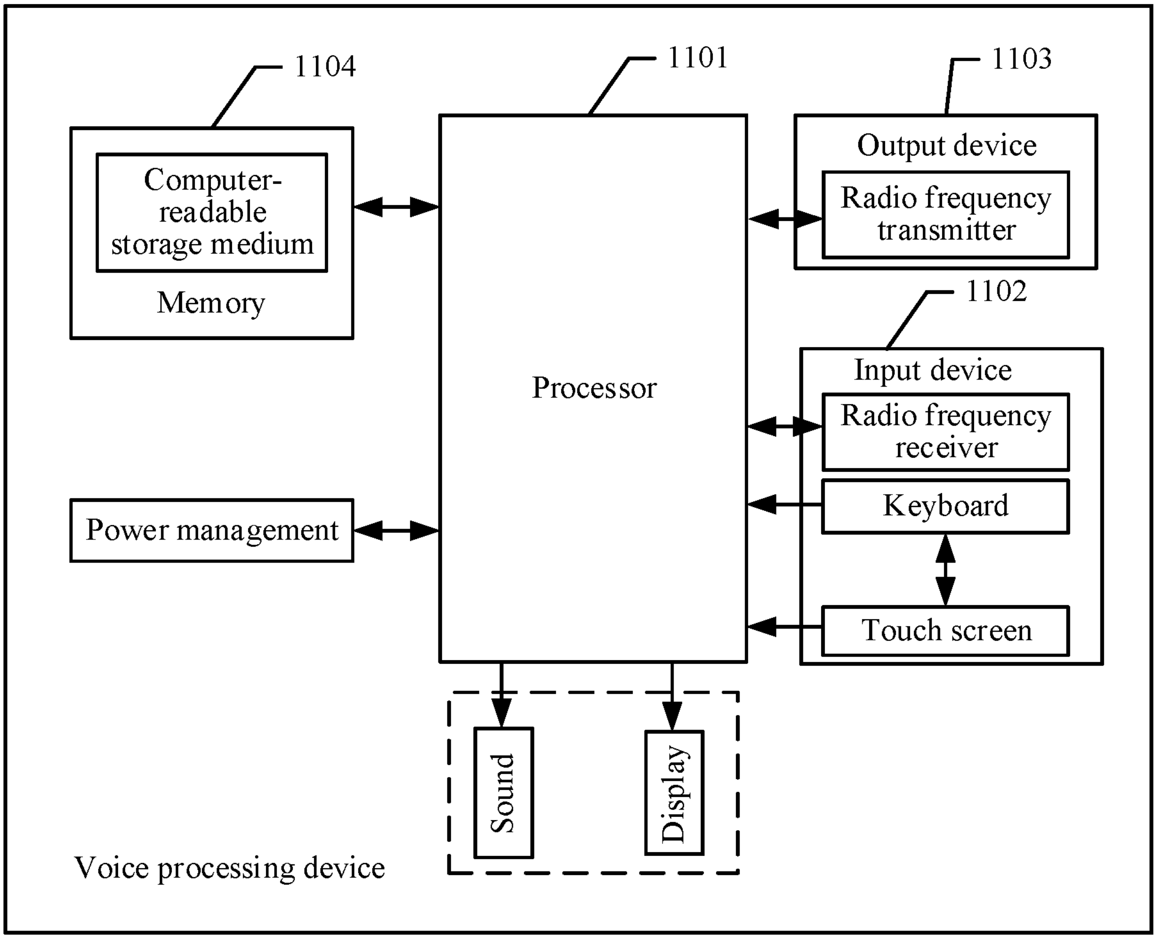
FIG. 11 is a schematic structural diagram of a voice processing device according to embodiment(s) of the present disclosure.

FIG. 11 is a schematic structural diagram of a voice processing device according to an embodiment of the present disclosure. Referring to FIG. 11, the voice processing device may be the receiving terminal shown in FIG. 1 or FIG. 2. The voice processing device includes a processor 1101, an input device 1102, an output device 1103, and a computer-readable storage medium 1104. The voice processing device may be a terminal or a server. In FIG. 11, the voice processing device being the server is used as an example. It may be understood that, when or in response to determining that the voice processing device is the server, a part (for example, the input device and a structure related to display) in the structure shown in FIG. 11 may be default.

The processor 1101, the input device 1102, the output device 1103, and the computer-readable storage medium 1104 are connected by using a bus or in other manners. The computer-readable storage medium 1104 may be stored in a memory of the voice processing device. The computer-readable storage medium 1104 is configured to store a computer program. The computer program includes program instructions (that is, executable instructions). The processor 1101 is configured to execute the program instructions stored in the computer-readable storage medium 1104. The processor 1101 (or referred to as a central processing unit (CPU)) is a computing core and a control core of the voice processing device, which is configured to implement one or more instructions (that is, the executable instructions), and configured to load and execute the one or more instructions to implement the corresponding method process or corresponding functions.

An embodiment of the present disclosure further provides a computer-readable storage medium (memory). The computer-readable storage medium is a memory device in the voice processing device, which is configured to store a program and data. It may be understood that, the computer-readable storage medium herein may include a built-in storage medium in the voice processing device, and may also include an extended storage medium supported by the voice processing device. The computer-readable storage medium provides a storage space. The storage space stores an operating system of the voice processing device. In addition, one or more instructions loaded and executed by the processor 1101 are also stored in the storage space. These instructions may be one or more computer programs (including program code). The computer-readable storage medium herein may be a high-speed random access memory (RAM), or a non-volatile memory, for example, at least one disk memory, and may further be at least one computer-readable storage medium away from the processor.

In some embodiments, the computer-readable storage medium stores one or more instructions. The one or more instructions stored in the computer-readable storage medium are loaded and executed by the processor 1101, to implement the corresponding steps of the voice processing method in the embodiment shown in FIG. 4 or FIG. 5. During the specific implementation, the one or more instructions stored in the computer-readable storage medium are loaded and executed by the processor 1101 to implement the following steps: determining a historical voice frame corresponding to a to-be-processed target voice frame; determining a frequency-domain characteristic of the historical voice frame; invoking a network model to predict the frequency-domain characteristic of the historical voice frame, to obtain a parameter set of the target voice frame, the parameter set including a plurality of types of parameters, the network model including a plurality of NNs, and a number of the types of the parameters in the parameter set being determined according to a number of the NNs; and reconstructing the target voice frame according to the parameter set.

In some embodiments, the one or more instructions stored in the computer-readable storage medium are loaded and executed by the processor 1101, to implement the corresponding steps of the voice processing method in the embodiment shown in FIG. 3. During the specific implementation, the one or more instructions in the computer-readable storage medium are loaded and executed by the processor 1101 to implement the following steps: receiving a voice signal transmitted by a VoIP system; reconstructing a target voice frame in the voice signal by using the method shown in FIG. 4 or FIG. 5 when or in response to determining that the target voice frame is lost; and outputting the voice signal based on the reconstructed target voice frame.

In some embodiments, the one or more instructions stored in the computer-readable storage medium are loaded by the processor 1101 to perform the following steps: acquiring redundant information of the target voice frame; reconstructing the target voice frame in the voice signal according to the redundant information of the target voice frame when or in response to determining that the target voice frame is lost; and reconstructing the target voice frame by using the method shown in FIG. 4 or FIG. 5 when or in response to determining that the reconstruction of the target voice frame according to the redundant information of the target voice frame fails.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the procedures of the methods in the embodiments may be implemented by a computer program instructing relevant hardware. The computer program may be stored in a non-volatile computer-readable storage medium. When the program is executed, the procedures of the method embodiments may be performed. The computer-readable storage medium may be a magnetic disk, an optical disk, a read-only memory (ROM), a RAM, or the like.

What is disclosed above is merely exemplary embodiments of the present disclosure, and is not intended to limit the scope of the claims of the present disclosure. Therefore, equivalent variations made in accordance with the claims of the present disclosure shall fall within the scope of the present disclosure.

What is claimed is:

1. A voice processing method, comprising:

determining a historical voice frame corresponding to a target voice frame;

determining a frequency-domain characteristic of the historical voice frame;

invoking a network model to predict the frequency-domain characteristic of the historical voice frame, to obtain a parameter set of the target voice frame, the parameter set including a plurality of types of parameters, the network model including a first neural network (NN) and a plurality of second NNs, and invoking the network model comprising:

invoking the first NN to predict the frequency-domain characteristic of the historical voice frame, to obtain a virtual frequency-domain characteristic of the target voice frame;

invoking the second NNs to predict the virtual frequency-domain characteristic of the target voice frame, to obtain parameters corresponding to the second NNs; and establishing the parameter set of the target voice frame according to the parameters respectively corresponding to the plurality of second NNs; and reconstructing the target voice frame according to the parameter set.

2. The method according to claim 1, wherein determining the frequency-domain characteristic of the historical voice frame comprises:

performing time-frequency transform on the historical voice frame to obtain a frequency-domain coefficient corresponding to the historical voice frame; and using the frequency-domain coefficient or an amplitude spectrum extracted from the frequency-domain coefficient as the frequency-domain characteristic of the historical voice frame.

3. The method according to claim 2, wherein performing the time-frequency transform comprises:

performing short-term Fourier transform (STFT) on the historical voice frame, to obtain a plurality of sets of STFT coefficients corresponding to the historical voice frame; and using the frequency-domain coefficient or an amplitude spectrum extracted from the frequency-domain coefficient as the frequency-domain characteristic of the historical voice frame comprises:

performing any one of:

using the plurality of sets of STFT coefficients as the frequency-domain characteristic of the historical voice frame; and forming an amplitude coefficient sequence according to amplitude spectra corresponding to at least some of the STFT coefficients in each set of STFT coefficients, and using the amplitude coefficient sequence as the frequency-domain characteristic of the historical voice frame.

4. The method according to claim 1, wherein the network model includes a third NN; and establishing the parameter set of the target voice frame according to the parameters respectively corresponding to the plurality of second NNs comprises:

acquiring an energy parameter of the historical voice frame;

invoking the third NN to predict the energy parameter of the historical voice frame, to obtain an energy parameter of the target voice frame; and establishing the parameter set of the target voice frame according to the parameters respectively corresponding to the plurality of second NNs and the energy parameter of the target voice frame, the target voice frame including m subframes, the energy parameter of the target voice frame including a gain value of each of the subframes of the target voice frame, and m being a positive integer.

5. The method according to claim 1, wherein reconstructing the target voice frame comprises:

establishing a reconstruction filter according to the parameter set;

acquiring an excitation signal of the historical voice frame;

determining an excitation signal of the target voice frame according to the excitation signal of the historical voice frame; and filtering the excitation signal of the target voice frame according to the reconstruction filter, to obtain a reconstructed target voice frame.

6. The method according to claim 5, wherein the target voice frame is an $n^{th}$ voice frame in a voice signal transmitted by a voice over Internet protocol (VoIP) system, the historical voice frame includes an $(n-t)^{th}$ voice frame to an $(n-1)^{th}$ voice frame in the voice signal transmitted by the VoIP system, n and t being both positive integers, and the excitation signal of the historical voice frame includes an excitation signal of the $(n-1)^{th}$ voice frame; and determining the excitation signal of the target voice frame comprises determining the excitation signal of the $(n-1)^{th}$ voice frame as the excitation signal of the target voice frame.

7. The method according to claim 5, wherein the target voice frame is an $n^{th}$ voice frame in a voice signal transmitted by a VoIP system, the historical voice frame includes an $(n-t)^{th}$ voice frame to an $(n-1)^{th}$ voice frame in the voice signal transmitted by the VoIP system, n and t being both positive integers, and the excitation signal of the historical voice frame includes an excitation signal of each voice frame in the $(n-t)^{th}$ voice frame to the $(n-1)^{th}$ voice frame; and determining the excitation signal of the target voice frame comprises:

averaging the excitation signals of the voice frames in the $(n-t)^{th}$ voice frame to the $(n-1)^{th}$ voice frame to obtain the excitation signal of the target voice frame; or performing weighted summation on the excitation signals of the voice frames in the $(n-t)^{th}$ voice frame to the $(n-1)^{th}$ voice frame to obtain the excitation signal of the target voice frame.

8. The method according to claim 5, wherein in response to determining that the target voice frame is an unvoiced frame, the parameter set includes a short-term correlation parameter of the target voice frame, and the reconstruction filter includes a linear predictive coding (LPC) filter;

the target voice frame including k daughter frames, the short-term correlation parameter of the target voice frame including a line spectral frequency (LSF) of a $k^{th}$ daughter frame of the target voice frame and an interpolation factor of the target voice frame, and k being an integer greater than 1.

9. The method according to claim 8, wherein filtering the excitation signal of the target voice frame comprises:

performing interpolation according to the LSF of the $k^{th}$ daughter frame and the interpolation factor of the target voice frame, to obtain an LSF of a daughter frame different from the $k^{th}$ daughter frame;

determining an LPC coefficient of any one daughter frame according to an LSF of the any one daughter frame;

performing LPC filtering according to the excitation signal of the target voice frame and the LPC coefficient of the any one daughter frame, to obtain any one reconstructed daughter frame; and synthesizing the k reconstructed daughter frames to obtain the reconstructed target voice frame.

10. The method according to claim 9, wherein the parameter set includes energy parameters respectively corresponding to the k daughter frames of the target voice frame; and the method further comprises:

performing signal amplification on the any one reconstructed daughter frame according to the energy parameter of the any one daughter frame.

11. The method according to claim 5, wherein in response to determining that the target voice frame is a voiced frame, the parameter set includes a short-term correlation parameter of the target voice frame and a long-term correlation parameter of the target voice frame, and the reconstruction filter includes a long-term predictive (LTP) filter and an LPC filter;

the target voice frame including k daughter frames, the short-term correlation parameter of the target voice frame including an LSF of a $k^{th}$ daughter frame of the target voice frame and an interpolation factor of the target voice frame, and k being an integer greater than 1;

the target voice frame including m subframes, the long-term correlation parameter of the target voice frame including a pitch lag of each subframe of the target voice frame and an LTP coefficient of the each subframe of the target voice frame, and m being a positive integer.

12. The method according to claim 11, wherein filtering the excitation signal of the target voice frame comprises:

performing LTP filtering according to the excitation signal of the target voice frame, the LTP coefficient of any one subframe of the target voice frame, and the pitch lag of the any one subframe, to obtain an LTP filtering result of the any one subframe;

synthesizing an LTP filtering result of at least one subframe included in the daughter frames of the target voice frame, to obtain an LTP synthesis signal of the daughter frames;

performing interpolation according to the LSF of the $k^{th}$ daughter frame and the interpolation factor of the target voice frame, to obtain an LSF of a daughter frame different from the $k^{th}$ daughter frame;

determining an LPC coefficient of any one daughter frame according to an LSF of the any one daughter frame;

performing LPC filtering according to the excitation signal of the target voice frame, the LTP synthesis signal of the any one daughter frame, and the LPC coefficient of the any one daughter frame, to obtain any one reconstructed daughter frame; and synthesizing the k reconstructed daughter frames to obtain the reconstructed target voice frame.

13. The method according to claim 12, wherein performing LTP filtering comprises:

performing tracing by using the any one subframe as a starting point according to the pitch lag of the any one subframe in response to determining that the pitch lag of the any one subframe is greater than or equal to a threshold, and using a sample point obtained by the tracing as a historical sample point; and performing LTP filtering according to the excitation signal of the target voice frame, the LTP coefficient of the any one subframe, and the historical sample point, to obtain the LTP filtering result of the any one subframe; and the method further comprises:

skipping the operation of performing the LTP filtering on the any one subframe in response to determining that the pitch lag of the any one subframe is less than the threshold.

14. The method according to claim 12, wherein the parameter set includes energy parameters respectively corresponding to the k daughter frames of the target voice frame; and the method further comprises:

performing signal amplification on the any one reconstructed daughter frame according to the energy parameter of the any one daughter frame.

15. The method according to claim 1, further comprising:

acquiring redundant information of the target voice frame; and reconstructing the target voice frame according to the redundant information; and determining the historical voice frame comprises:

determining the historical voice frame corresponding to the target voice frame in response to determining that the reconstruction of the target voice frame according to the redundant information fails.

16. The method according to claim 1, wherein the historical voice frame includes:

a voice frame transmitted before the target voice frame and not lost, or a voice frame transmitted before the target voice frame and reconstructed after being lost.

17. A voice processing device, comprising: at least one memory storing computer program instructions; and at least one processor coupled to the at least one memory and configured to execute the computer program instructions and perform:

determining a historical voice frame corresponding to a target voice frame;

determining a frequency-domain characteristic of the historical voice frame;

invoking a network model to predict the frequency-domain characteristic of the historical voice frame, to obtain a parameter set of the target voice frame, the parameter set including a plurality of types of parameters, the network model including a first neural network (NN) and a plurality of second NNs, and invoking the network model comprising:

invoking the first NN to predict the frequency-domain characteristic of the historical voice frame, to obtain a virtual frequency-domain characteristic of the target voice frame;

invoking the second NNs to predict the virtual frequency-domain characteristic of the target voice frame, to obtain parameters corresponding to the second NNs; and establishing the parameter set of the target voice frame according to the parameters respectively corresponding to the plurality of second NNs; and reconstructing the target voice frame according to the parameter set.

18. The voice processing device according to claim 17, wherein determining the frequency-domain characteristic of the historical voice frame includes:

performing time-frequency transform on the historical voice frame to obtain a frequency-domain coefficient corresponding to the historical voice frame; and using the frequency-domain coefficient or an amplitude spectrum extracted from the frequency-domain coefficient as the frequency-domain characteristic of the historical voice frame.

19. A non-transitory computer-readable storage medium storing computer program instructions executable by at least one processor to perform:

determining a historical voice frame corresponding to a target voice frame;

determining a frequency-domain characteristic of the historical voice frame;

invoking a network model to predict the frequency-domain characteristic of the historical voice frame, to obtain a parameter set of the target voice frame, the parameter set including a plurality of types of parameters, the network model including a first neural network (NN) and a plurality of second NNs, and invoking the network model comprising:

invoking the first NN to predict the frequency-domain characteristic of the historical voice frame, to obtain a virtual frequency-domain characteristic of the target voice frame;

invoking the second NNs to predict the virtual frequency-domain characteristic of the target voice frame, to obtain parameters corresponding to the second NNs; and establishing the parameter set of the target voice frame according to the parameters respectively corresponding to the plurality of second NNs; and reconstructing the target voice frame according to the parameter set.

* * * * *